(12) United States Patent
Bruinsma

(10) Patent No.: US 10,556,271 B2
(45) Date of Patent: Feb. 11, 2020

(54) PIPE END TRUING APPARATUS AND METHOD

(71) Applicant: Gregg Richard Bruinsma, High River (CA)

(72) Inventor: Gregg Richard Bruinsma, High River (CA)

( * ) Notice: Subject to any disclaimer, the term of this patent is extended or adjusted under 35 U.S.C. 154(b) by 97 days.

(21) Appl. No.: 15/799,373

(22) Filed: Oct. 31, 2017

(65) Prior Publication Data

US 2018/0243832 A1 Aug. 30, 2018

Related U.S. Application Data

(60) Provisional application No. 62/464,852, filed on Feb. 28, 2017.

(51) Int. Cl.
| | |
|---|---|
| *B23B 5/16* | (2006.01) |
| *B24B 23/02* | (2006.01) |
| *B24B 23/08* | (2006.01) |
| *B23Q 9/00* | (2006.01) |
| *B23C 3/02* | (2006.01) |
| *B23C 3/00* | (2006.01) |
| *B24B 9/00* | (2006.01) |
| *B23Q 9/02* | (2006.01) |

(52) U.S. Cl.
CPC .............. *B23B 5/168* (2013.01); *B23C 3/007* (2013.01); *B23C 3/02* (2013.01); *B23Q 9/0021* (2013.01); *B23Q 9/02* (2013.01); *B24B 9/007* (2013.01); *B24B 23/028* (2013.01); *B24B 23/08* (2013.01)

(58) Field of Classification Search
CPC ....... B24B 9/007; B24B 23/028; B24B 23/08; B23B 5/168; B23C 3/02
USPC ............................................... 451/51, 61, 67
See application file for complete search history.

(56) References Cited

U.S. PATENT DOCUMENTS

| | | | | |
|---|---|---|---|---|
| 2,403,363 A | * | 7/1946 | Hanson, Jr. ............. | B24B 9/007 451/440 |
| 2,600,402 A | * | 6/1952 | Griffin .................. | B24B 17/021 451/238 |
| 2,610,452 A | * | 9/1952 | Hill ........................ | B24B 5/162 451/49 |
| 2,931,146 A | * | 4/1960 | Handwerk ............. | B24B 9/007 451/415 |
| 3,458,958 A | * | 8/1969 | Douglas ................. | B24B 9/007 451/270 |

(Continued)

*Primary Examiner* — George B Nguyen
(74) *Attorney, Agent, or Firm* — Parlee McLaws LLP; Chi Fai Andrew Lau

(57) ABSTRACT

A jig and tool are provided for rotating the tool around a pipe or pipeline, for truing the pipe end. An operator can easily installation the jig into the pipe end, with or without the cutting tool installed thereto. The tool can be manually or motor driven for rotation about the jig and the pipe end. The attachment of the tool to the jig enables alignment of the tool's cutting face with the pipe end, with angular and axial adjustment available for obtaining a profile suitable for welding to like pipe ends. In an embodiment, the tool can track the pipe diameter to retain alignment despite out-of-round dimensional variation. The tool is operated and rotated about the pipe end to remove material and, as necessary, the tool is adjusted into the pipe end and the rotation about the pipe end is repeated for incremental removal of material therefrom.

18 Claims, 23 Drawing Sheets

(56) References Cited

U.S. PATENT DOCUMENTS

| | | | | |
|---|---|---|---|---|
| 3,501,872 | A | * | 3/1970 | Mighton .................. B23B 5/168 451/441 |
| 5,076,025 | A | * | 12/1991 | Reeble .................... B23B 5/162 269/48.1 |
| 6,012,973 | A | * | 1/2000 | Nagel ....................... B24B 1/00 451/27 |
| 7,712,404 | B1 | * | 5/2010 | Markle ................... B23B 5/167 407/39 |
| 2009/0071312 | A1 | * | 3/2009 | Edmonds ............. B23Q 9/0085 83/829 |
| 2011/0053469 | A1 | * | 3/2011 | McDowell ................ B24B 5/40 451/61 |

* cited by examiner

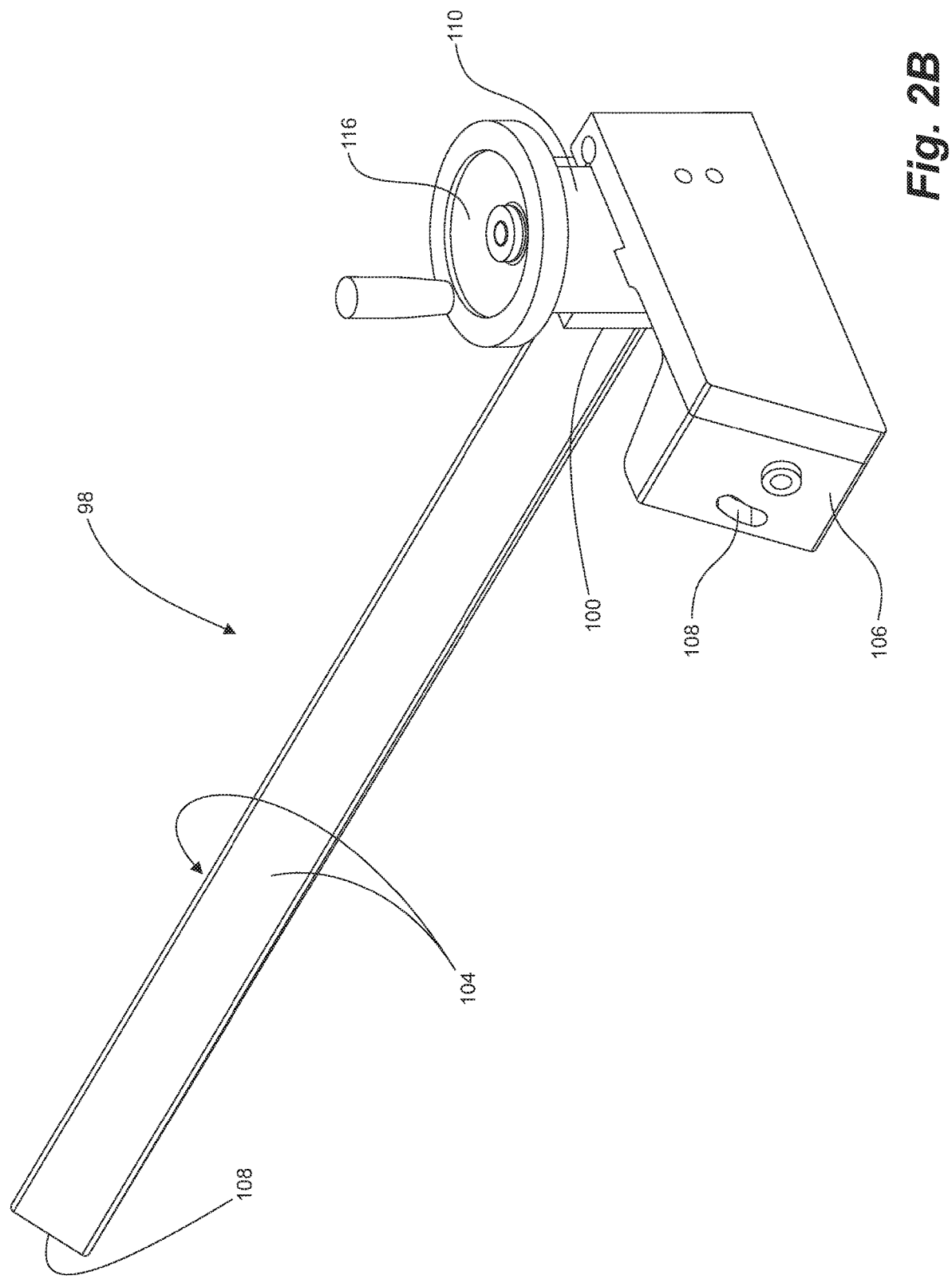

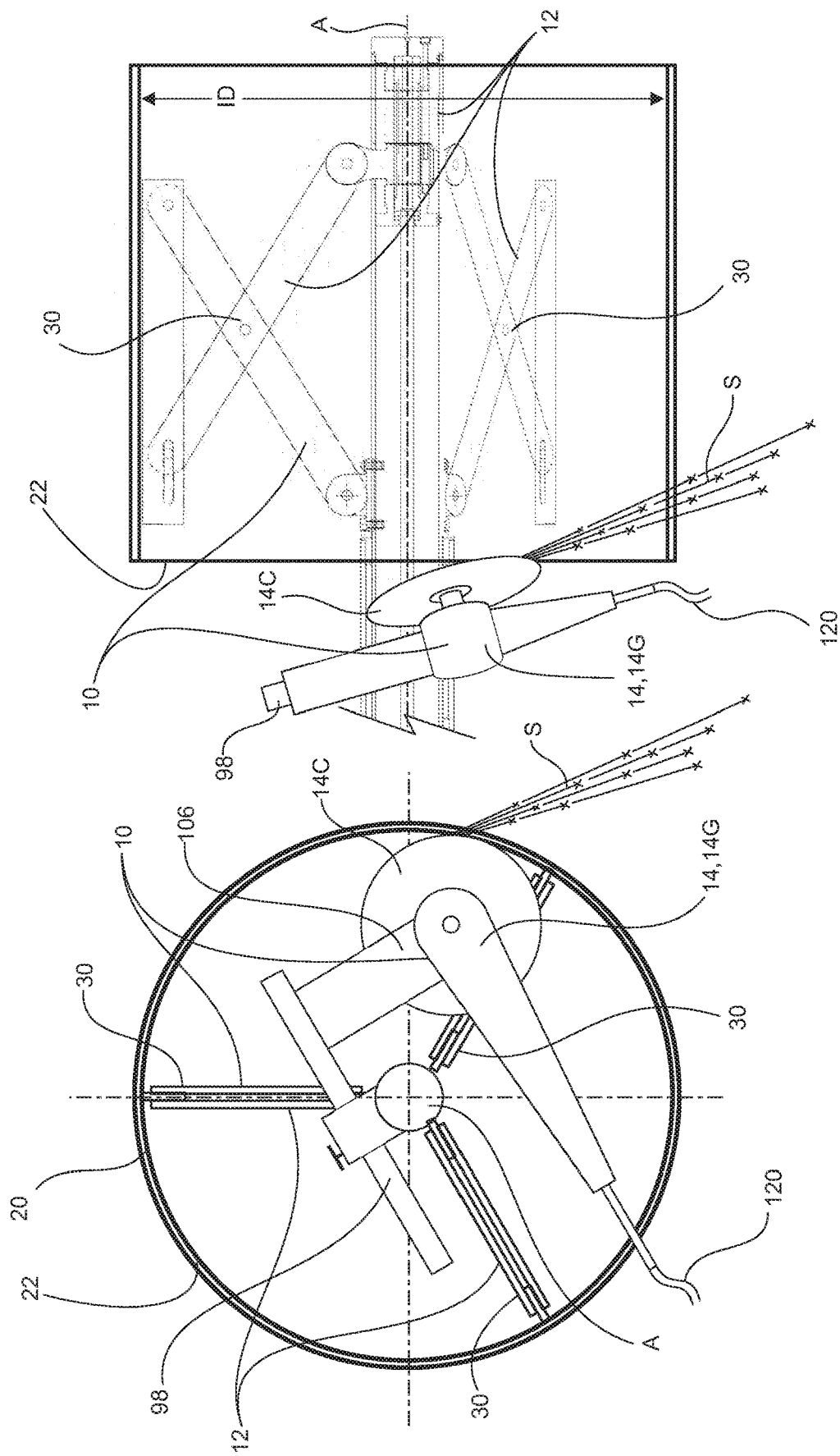

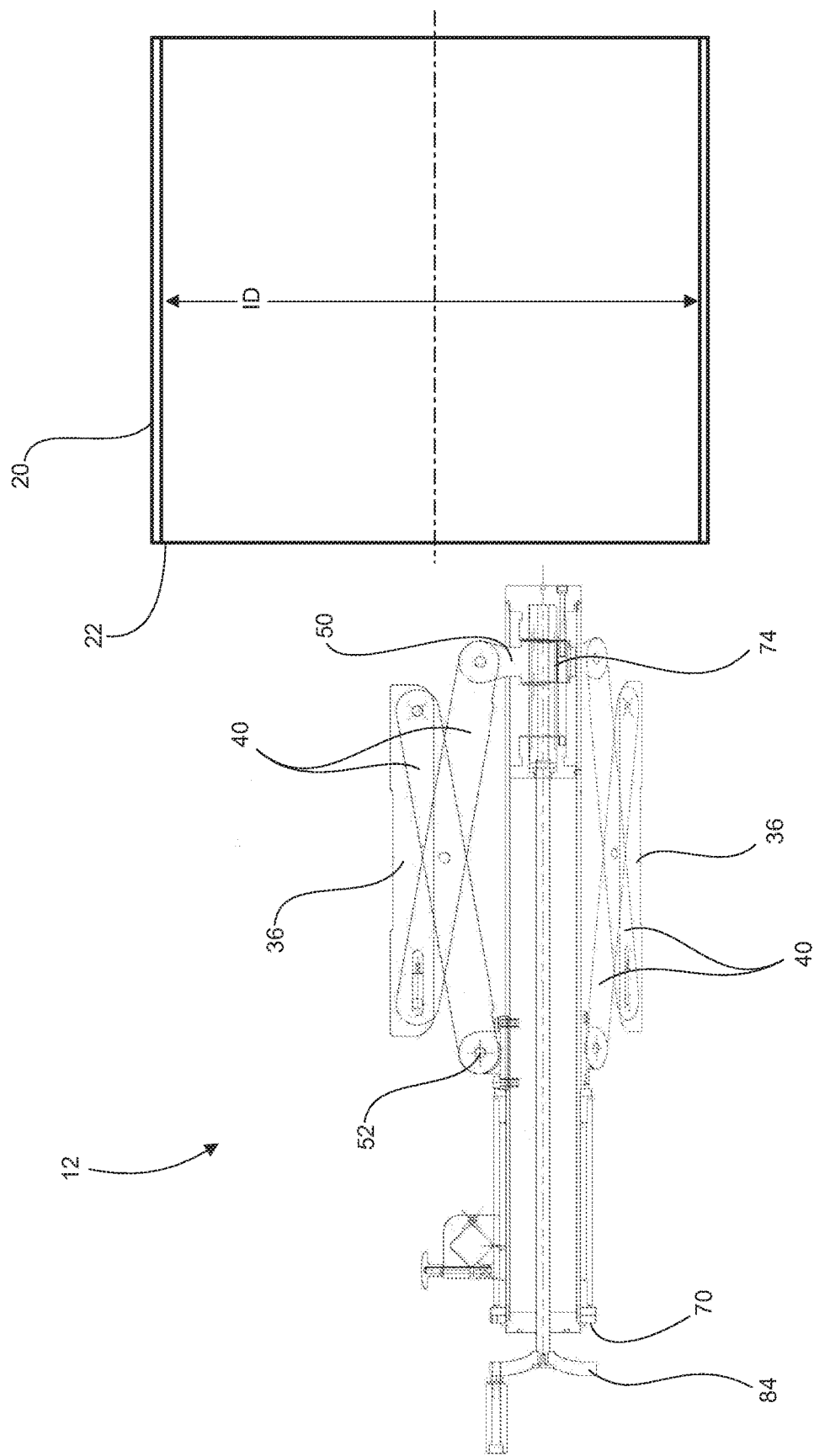

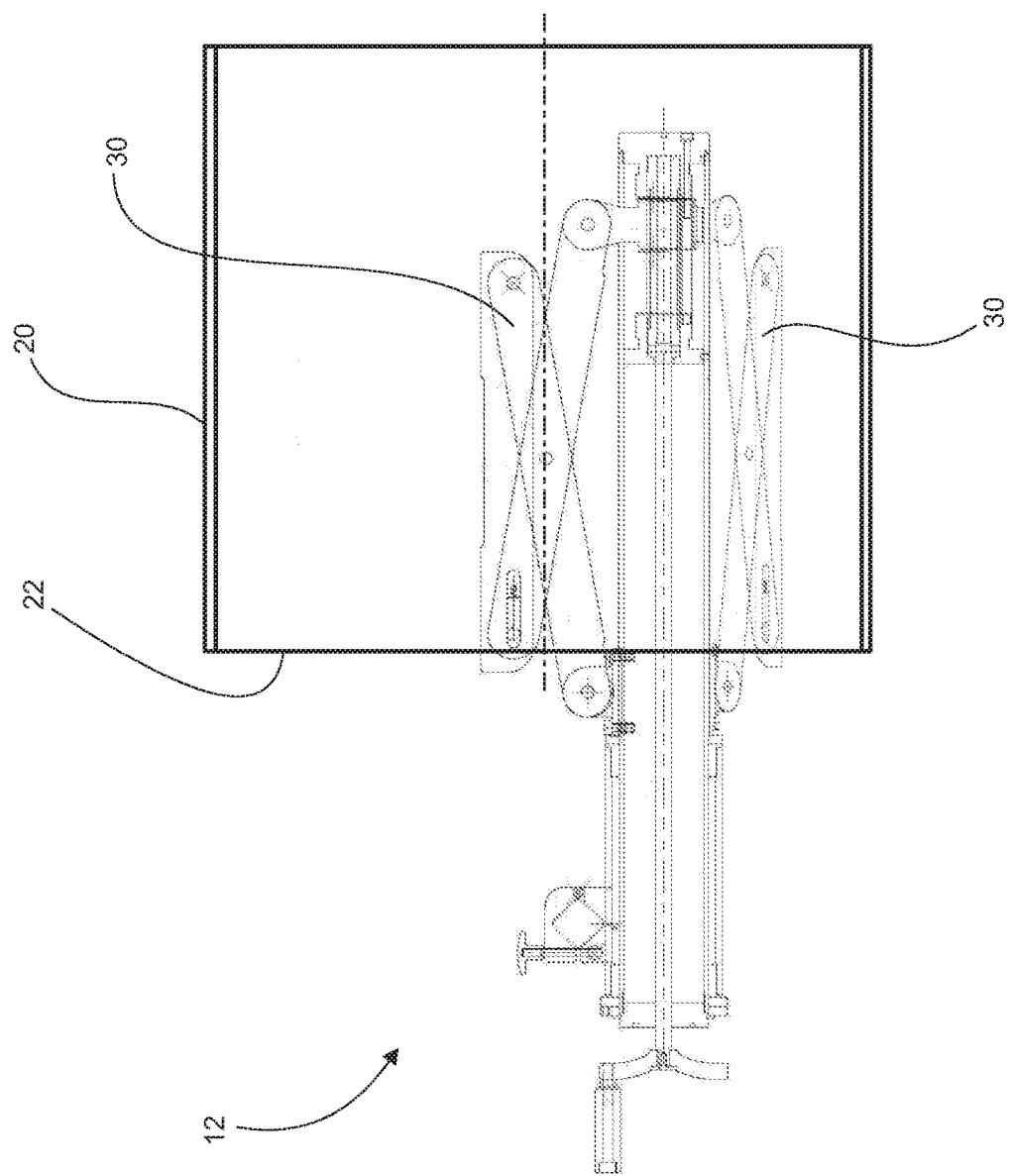

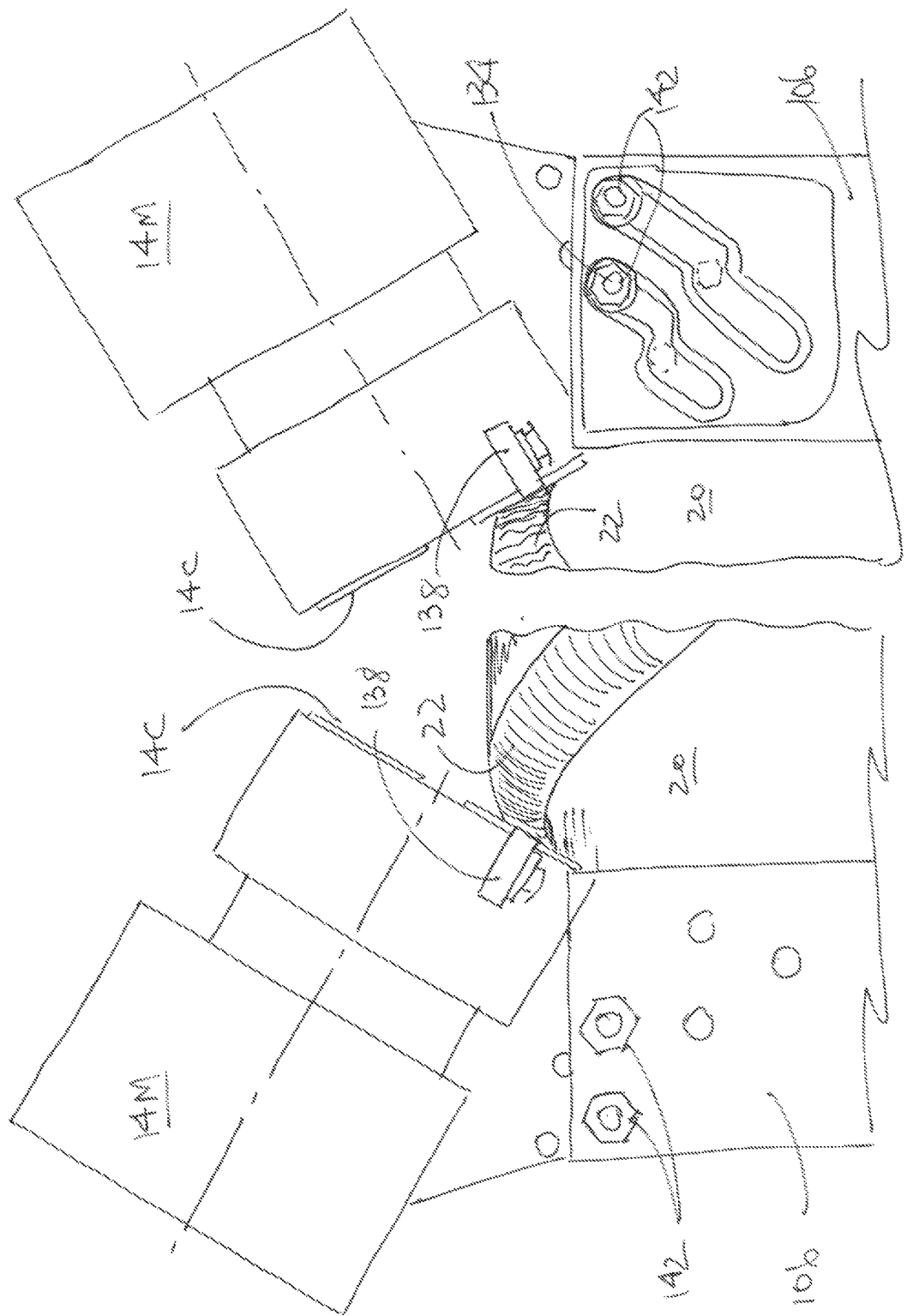

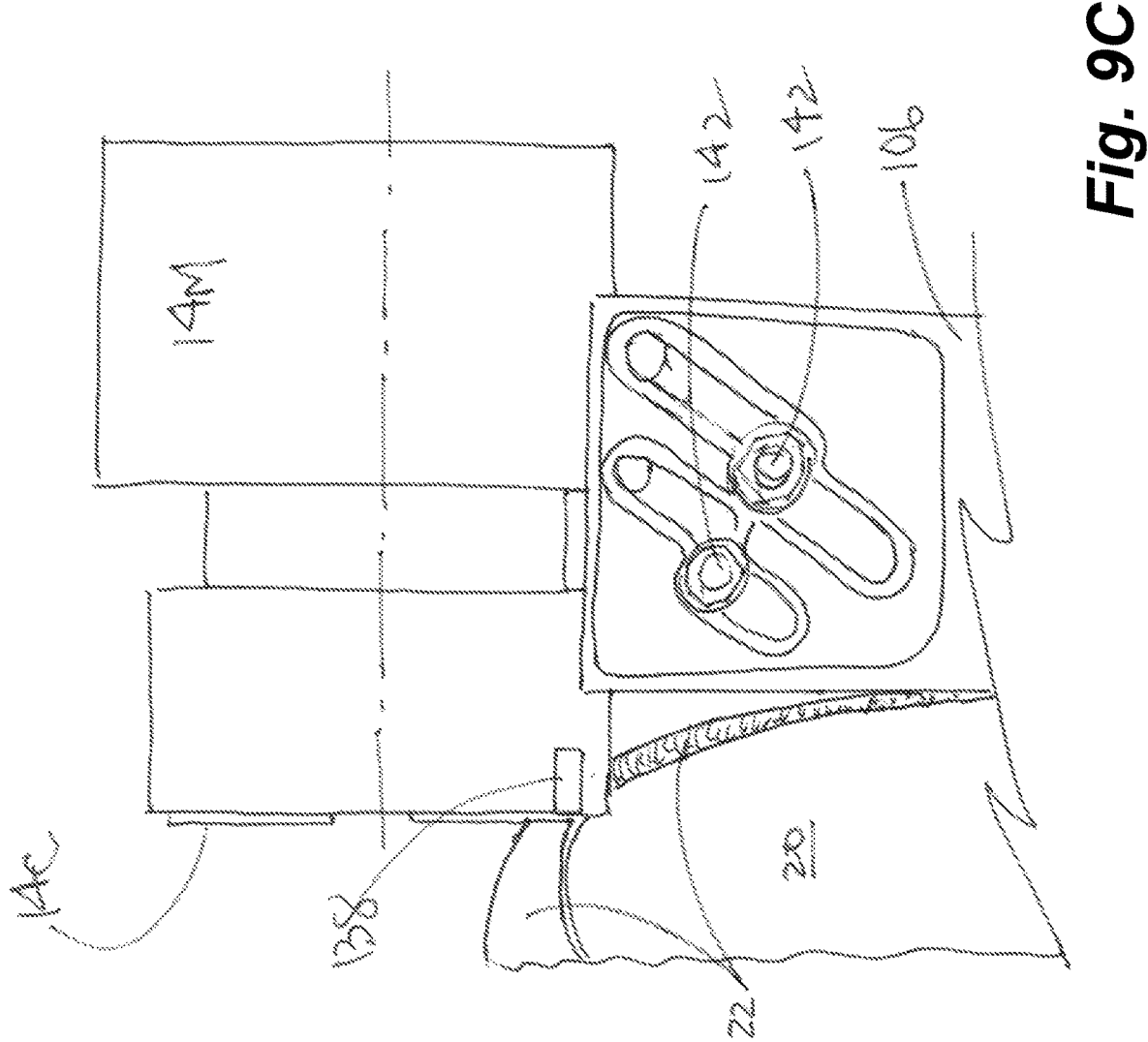

Fig. 10

PIPE END TRUING APPARATUS AND METHOD

CROSS REFERENCE TO RELATED APPLICATIONS

This application claims the benefits under 35 U.S.C 119(e) of U.S. Provisional Application Ser. No. 62/464,852 filed Feb. 28, 2017 the entirely of which is incorporated fully herein by reference.

FIELD

Embodiments herein relate to apparatus for dressing or truing pipe ends, and more particularly to tools for aligning a truing tool for preparing a bevel on a pipe or pipeline for a butt welding.

BACKGROUND

Pipeline construction requires pipe ends be prepared for butt welding. Typically this requires dressing or cleaning up the pipe ends and ensuring they are trued-up or otherwise made parallel with to the opposing end, usually square, beveled and aligned end-to-end and welded. Often the pipe ends for one reason or another are not factory square, such as when cut in the field to fit. Such ends are often flame cut using a cutting torch and which results in a significant time to clean up the butt ends before welding together.

While grinders are used to grind off high spots, slag or other imperfections, the work is manual and can result in variable welding gaps and misalignment.

SUMMARY

Generally, a jig and tool are provided for aiding in rotation of the tool around a pipe end for cleaning, dressing or otherwise truing the pipe end in preparation for welding. A variety of tools can be used which are capable of removing metal from pipe ends and providing a weldable interface. The jig enables hand or automated rotation of the select tool about the pipe end, alignment of the tool's cutting face with the pipe end, and angular and axial adjustment for obtaining one or more welding profiles. In an embodiment, the tool can track the pipe to retain alignment despite some out of round dimensional variation.

The jig can be handled by one individual as necessary, the jig itself being lightweight and optionally installed to the pipe first before adding one or more of the tool attachment and the tool itself.

In one aspect, apparatus is provided for truing the pipe end of a generally circular pipe having an inside diameter and an axis. A jig portion comprises a body, two of more centralizing standoffs, and a rotary sleeve. The jig has a first end and a second end for placement within the pipe, two or more standoffs extending radially from the body and operable between a retracted position and an expanded position, wherein the expanded position the standoffs releasably engage the inside diameter of the pipe for locating the body generally concentric within the pipe along the pipe axis with the sleeve accessible from the pipe end; and a sleeve for rotation about the first end of the body. A tool is supported from the sleeve for engaging the pipe end and rotatable thereabout with the sleeve.

The apparatus can further comprise a mounting arm and tool mount for supporting and spacing the tool radially from the sleeve. The tool mount can also have an axial adjustment mechanism, an angular adjustment mechanism, or both for adjusting the tool's engagement with the pipe end.

In another aspect, a method of truing a circular pipe end of a pipe is provided using the jig and tool above. Firstly, one inserts the jig into the pipe end. The standoffs are expanded radially for securing the body centralized within the pipe's axis. Before or after installation, one accesses the jig's first end and secures the tool to the jig for engaging the pipe end. One then operates the tool to remove material from the pipe end; and rotates the operating tool about the jig's body for truing the circumference of the pipe end.

In embodiments, the tool can be manually rotated about the pipe end or motor-driven. The tool is operated to remove material from the pipe end and as necessary, the tool is adjusted axially into the pipe end and the rotation about the pipe end is repeated for incremental removal of material.

BRIEF DESCRIPTION OF THE DRAWINGS

FIG. 2B is perspective view of one embodiment of a tool mount and attachment arm of FIG. 1B;

FIG. 2C is an end view of the truing jig of FIG. 1A installed and centered within a pipe end, with a trueing tool secured to the attachment mount and shown in the process of grinding the pipe end;

FIG. 2D is an side view of the truing jig and pipe end of FIG. 1C with the standoffs illustrated in hidden lines within the pipe end;

FIGS. 3A through 3F illustrate schematic side views of steps for installing and centering the truing jig and aligning the tool with the pipe end, more particularly:

FIG. 3A illustrates a truing jig, in the retracted position, ready for installation into a pipe end;

FIG. 3B illustrates the initial installation of the truing jig of FIG. 3B, in the retracted position, into the pipe end;

FIG. 3C illustrates sliding the jig fully into the pipe end;

FIG. 3D illustrates actuation of the standoffs to the extended centering position within the pipe end;

FIG. 3E illustrates installation of the attachment arm to the truing tool;

FIG. 3F illustrates installation of a tool to the attachment arm and aligned to the pipe end;

FIG. 7A is an end view of the attachment arm and the milling tool aligned with the pipe end;

FIG. 7B is a side view of the attachment arm and milling tool aligned with the pipe end;

FIGS. 9A and 9B are side view of a right hand and left hand views of the milling tool cutting a bevel to a pipe end, illustrating angular adjustment bolting array;

FIG. 9C is a left hand side view of the tool with the tool angle adjusted to square to the pipe end;

FIG. 10 is a side view of the tool and a tracking wheel engaging the pipe, the tool mount shown in partial view;

DETAILED DESCRIPTION OF THE EMBODIMENTS

Figure 1A:
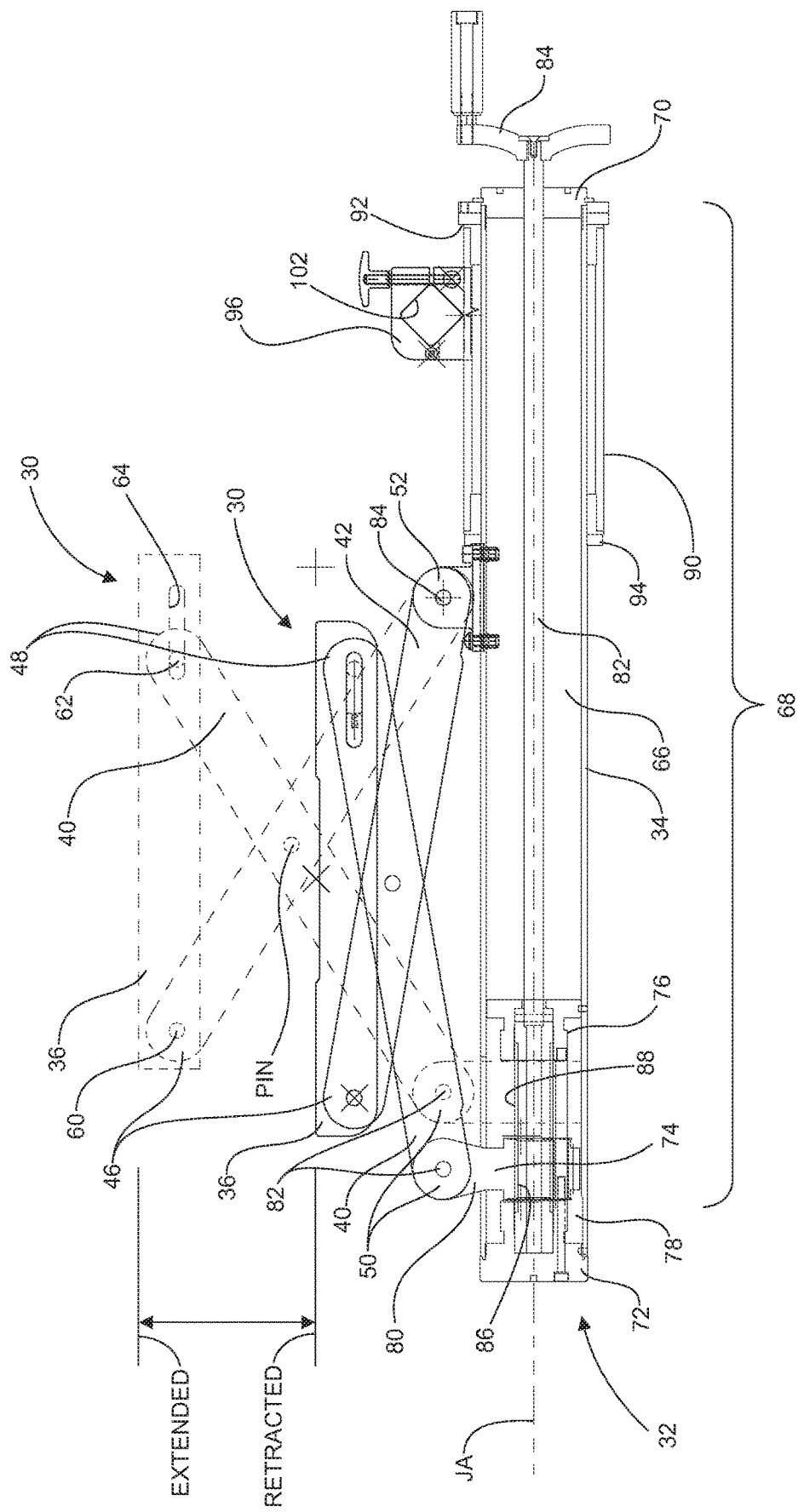
FIG. 1A is a side view of one embodiment of a truing jig for pipe end dressing, illustrating only one of three centering standoffs shown in an retracted and an extended position (dotted lines)

With reference to FIGS. 2C and 2D, truing apparatus 10 is provided comprising a jig 12 and a tool 14. The jig 12 is provided for support by a workpiece having a free edge including a tubular pipe 20, the jig 12 enabling rotation of the tool 14 about the pipe 20 for dressing, truing and shaping of the pipe's end 22. The pipe 20 has an axis A and the pipe end 22 has a generally circular cross-section. The pipe end 22 extends circumferentially about the axis A at a generally consistent radius.

The jig 12 and tool 14 prepare the pipe's end 22 for effective butt welding with a like pipe end (not shown). Typically this requires dressing or cleaning up the pipe ends, ensuring they are trued-up or otherwise made concentric with and parallel to a (square) like, and opposing, pipe end. Further, the tool 14 prepares the welding interface or profile including the form, angle and depth of the face of the pipe end. Herein, this process is referred to generally as dressing or truing the pipe end. Once trued, the pipe end 22 and an opposing pipe end are aligned end-to-end and welded.

The truing apparatus 10 modifies the pipe end 22 by forming a ground or prepared surface having a profile base that is perpendicular to the pipe axis. Depending on the weld interface, such as a butt joint, the profile base is prepared or cut to include a profile such as a bevel, "J" or "U" style face. The arrangement of the tool 14 on the jig 12 can be adjusted incrementally radially and axially to remove additional workpiece material as the jig 12 rotates the tool 14 about the circumference of the pipe end 22.

The jig 12 is readily fit to a bore or inside diameter ID of the pipe 20 using a radially expandable and centering jig. Various forms of radially expandable, centering and securing devices include two or more expandable standoffs 30,30 . . . distributed circumferentially about the jig 12 and expandable between a retracted position (for insertion and axial movement) and an expanded position (shown in dotted lines—for securing the jig 12) within the inside of the pipe 20. Examples of such expandable devices include scissors apparatus, parallelogram or pantograph linkages.

Figure 2A:
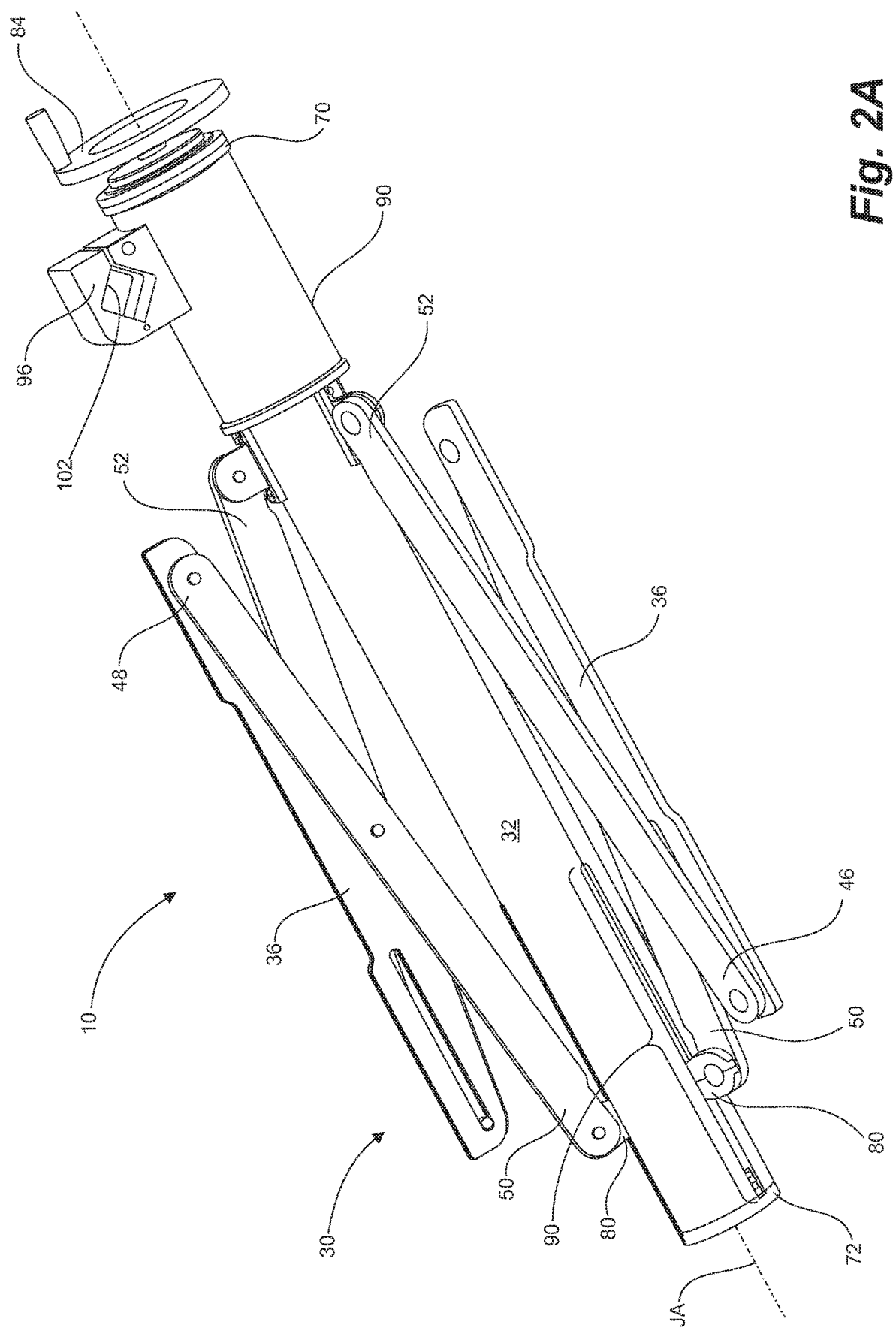
FIG. 2A is perspective view of the truing jig of FIG. 1A with two of three standoffs in view, the third hidden, and arranged in the retracted position for installation into a pipe end.

In more detail and with reference to FIGS. 1A and 2A, in the embodiment shown, three scissors jacks or standoffs 30,30,30 are provided, each standoff 30 implementing a form of pantograph linkage, extending radially and adjustable radially from a central body 32 and spaced angularly circumferentially and equally (at 120 degrees) thereabout. The body 32 has a jig axis JA.

Each standoff 30 is supported from the body 32 and when actuated to the extended position, the standoffs 30 locate the jig axis JA of the body 32 centralized at the axis A of the pipe 20. The body 32 comprises an outer tubular 34 to which the standoffs 30 are affixed. Each standoff 30 has a pipe-engaging support bar or foot 36, the foot 36 having an axially extending profile, the foot being maintained parallel to the jig's axis JA through the action of the linkage. Each standoff 30 is situated between the body 32 and its foot 36.

Each standoff 30 comprises a pair of lever arms 40,42 pivotally connected at an intermediate location by primary fulcrum or pin 44. An inner end 50,52 of each lever arm 40,42 is adjacent the central body 32, at one least inner end 50,52 of which is actuable axially (inner end 50 shown) for scissoring the inner ends of the lever arms together and apart relative to the other and fixed inner end 52,50 (fixed inner end 52 shown), for actuating the foot 36 between extended and retracted positions respectively. Outer ends 46,48 of each lever arm 40,42 also move together and apart between extended and retracted positions respectively. The outer ends 46,48 are coupled to opposing ends of the common support bar or foot 36, one link's outer end 46 being pivotally connected at pin 60 to the support bar 60 and the other link's outer end 48 being slidably guided at pin 62 in a slot 64 within the support bar 60 to permit movement of the outer ends 46,48 axially together and apart.

The central body's outer tubular 34 has a bore 66 which is fit with a linear actuator 68 for actuating the actuable inner ends 50 of each of the standoffs 30. Herein, the linear actuator 68 is fixed axially at one first end 70 of the central body 32, the other second end fixed axially at an opposing second end 72 of the body. A spider or carriage 74 is movable back and forth in the bore 66, and along the linear actuator 68, between first and second stops 76,78. The stops delimit the actuator movement such that each standoff 30 can expand at least to the internal diameter of the pipe 20. In some cases different diameter pipes may be served by the same jig, and in other cases, larger differences in diameter may require different jigs of different retraction and expansion range.

The carriage 74 has three lobes 80,80,80, each lobe 80 being pivotally connected at the pin 82 to the inner end 50 of a corresponding standoff 30.

With reference also to FIG. 2A, each lobe 80 extends radially through a slot 90 formed in the body's outer tubular 34. As the carriage 74 and lobes 80,80,80 are actuated back and forth along the axis A, the inner ends 50,50,50 of each standoff's linkage 30 move together and apart.

The linear actuator 68 has a rod 82 extending from the body's first end 70 to the second end 72. The first end 70 is a proximal, accessible end when the jig is fit into a pipe end. The second end is a distal, less accessible end within the pipe 20. The rod is actuable at the first end such as through rotary actuation by a handcrank 84. The rod can be supported at bushings, bearings or the like at the first and second ends 70,72 of the rod 82 and at the axial stops 76,78 straddling the carriage 74.

The carriage 74 can be supported for smooth action along the bore 66, moving relative to the supporting standoffs. In an embodiment the carriage 74 has a threaded bore 86 for axial actuation with a corresponding threaded portion 88 of the rod 82. The entire rod 82 could be threaded, but in this embodiment, only the portion 88 extending between stops 76,78 is threaded. The threaded portion 88 can be an acme or square thread as is known for enabling linear actuation.

The central body 32 has the first proximal end 70 that remains accessible adjacent or outside the pipe end. The second end 72 is a remote or distal end located within the pipe 20, spaced inward from the pipe end 22, when the jig 12 is inserted therein. The handcrank 84 can be located at the first proximal end 70.

The proximal first end 70 of the body's outer tubular 34 is also fit with a rotary sleeve 90. The rotary sleeve is a tubular sleeve fit rotatably about the tubular 34, sandwiched between annular, or ring, stops 92,94 spaced axially apart.

Figure 1B:
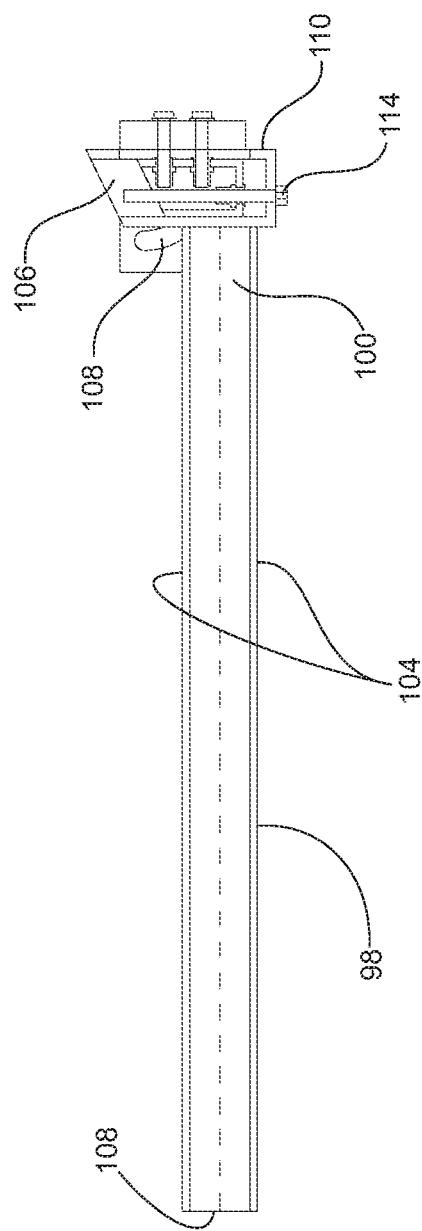
FIG. 1B is a tool mount and attachment arm for radial-adjustment and coupling with the truing jig of FIG. 1A.
Figure 1C:
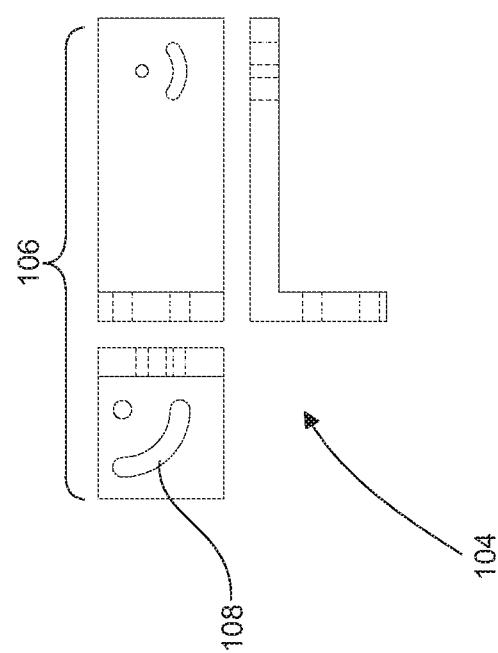
FIG. 1C is a detail of a simple tool mount of the form shown in FIG. 1B, the mount having an angular adjustment for the tool.

With reference also to FIGS. 1B, 1C and 2B, the sleeve 90 is fit with an attachment mount 96 for releasably fixing the tool 14 thereto. The attachment mount 96 releasably receive an attachment bar 98. The attachment bar 98 supports the tool 14 at a tool end 100 thereof.

The mount 96 has a clamping bore 102, and the bar 98 has a cross-sectional profile 104 that is irregular so as to fix rotation of the bar therein. As shown in the clamping bore 102 and bar profile 104 are polygonal, and more particularly rectangular or square. While prevented from relative rotation, the attachment bar 98 is slidably positionable therein permitting radial adjustment thereof relative to the pipe axis A. The clamping bore 102 oriented transverse and tangent to the central body 32, preferably perpendicular to the axis A thereof, for receipt of the attachment bar 98, enabling radial adjustment of the tool end 100 to accommodate a range of pipe diameters and fine adjustments of the truing of the pipe end 22.

The tool 14 can be releasable and adjustably supported on the tool end 100 at a tool mount 106 fit. A proximal end 108 of the attachment bar 98 can be a free end, having the same profile 104 as that of the remainder of the bar 98 for ease of installation to the attachment mount. The bar profile 104 can be of uniform cross-section therealong to enable slidable adjustment through the clamping bore 102 for radial positioning before the clamping bore 102 is clamped tight to the bar. As above, the bar 98 has an irregular or non-circular profile 104, and the clamping bore has a similar shape, so as to restrain reactive torque on the bar without relying on friction alone. In this embodiment, the clamping bore 102 and corresponding bar profile 104 are square or triangular (shown).

The bar 98 is rotatable about the body 32 through its connection to the sleeve 90. In embodiments in which the attachment bar 98 is linear, the operator arranges the jig 12 such that at least a portion of the sleeve 90 can be positioned axially outside the pipe end 22. If the bar 98 has an offset or other arrangement, the mount could be positioned within the pipe end 22.

As shown in this embodiment, the distal end tool mount 106 can provide an interface adapted to securely couple with the grinding head or conventional side handle of a grinder 14G. A grinder 14G is typically fit with a threaded, tapped mounting hole for a removable handle, that connection being available for securing to the mount 106. Other arrangements can be provided for clamping to an angle grinder head, or other means of securement.

The tool mount 106 is provided with adjustment mechanism 108 for angular positioning of the tool face relative to the pipe end and can also include a slide mechanism 110, for fine translation of the tool 14 generally towards or away from the pipe end 22. This slide or translation movement can be in addition to the macro positioning provided by the placement of the jig 12. The angular adjustments enable adjustment of a ground bevel groove angle from otherwise square surfaces. Several passes and different angles can also be conducted to dress the root face, and adjust root face height and bevel angle.

Figure 8A:
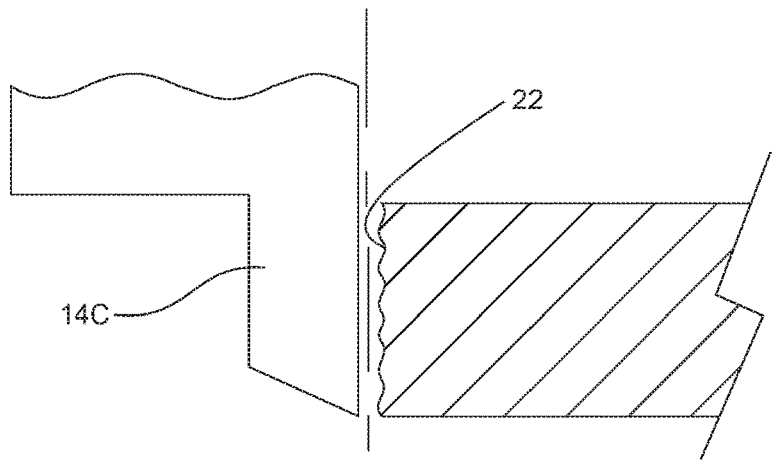
FIGS. 8A through 8D are side views of a tool truing a pipe end face, namely dressing a face, truing the face to square, shaping a bevel, and a side view of the interface of abutting trued pipe ends ready for butt welding.
Figure 8B:
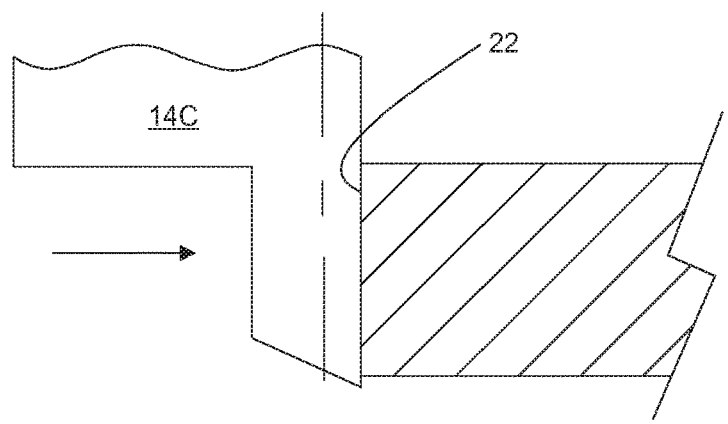
Figure 8C:
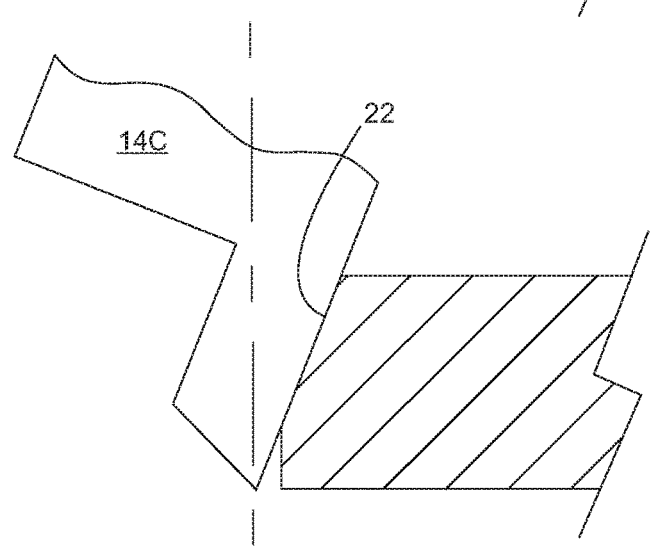
Figure 8D:
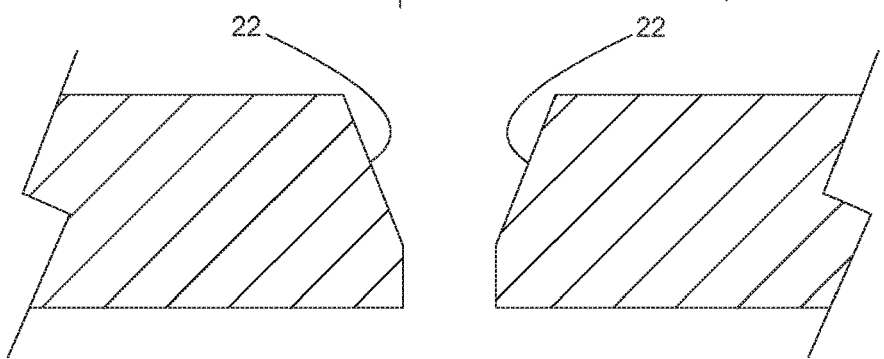

As shown in FIG. 8A, the tool can approach the pipe end 22, that initially has a rough cut face including a flame cut face advanced axially in FIG. 8B to dress the face, or as shown in FIG. 8C, angled and advanced axially to cut a bevel. Turning to FIG. 9, two opposing and like trued pipe ends can be aligned for butt welding.

Further, the transverse or axial adjustment of the tool by slide mechanism 110, relative to the attachment bar 98, can provide for small incremental advances, such as to sequentially remove additional material and serve to adjust the root face height, by grinding into the bevel. For example, once enough material is removed, or cutting becomes less effective, the tool 14 can be adjusted axially or advanced into the pipe end, for removing a next layer or simply a more aggressive grind. A simple translation or axial advance by slide mechanism 110 can also be provided using one or more pry bolts 114, adjusted using a wrench.

In FIGS. 2A & 2B, other advancing arrangements can be provided including a handwheel 116, for driving the slide mechanism 110 and mounted tool 14 relative to the tool end 100 and mount 106, towards and away from the pipe end 22.

With reference to FIGS. 1A and 3A through 3F, a typical method for truing the pipe end 22 is set forth as follows.

For ease of handling, the operator may choose to keep the jig 12 as light as possible for initially positioning within the pipe 20, firstly installing the jig 12 to the pipe 20 and only afterwards installing the tool 14, or even the attachment bar 96.

As shown in FIG. 3A, only the jig 12 is first inserted into the pipe end 22 for positioning in the bore or inside diameter of the pipe 20. The jig's linear actuator 68 is operated to retract the standoffs 20 radially towards the body 32. In this embodiment, the handwheel 84 at the proximal end 70 is rotated to shift the carriage 74, and each connected first inner end 50 of lever arms 40,40,40, away from away from its respective second inner end 52. The foot 36 of each standoff 30 moves to the retracted position, with the effective diameter of the jig 12 measured about the respective feet 36,36,36 of the standoffs 30,30,30, the effective diameter being less than the inside diameter ID of the pipe 20.

Figure 3B:
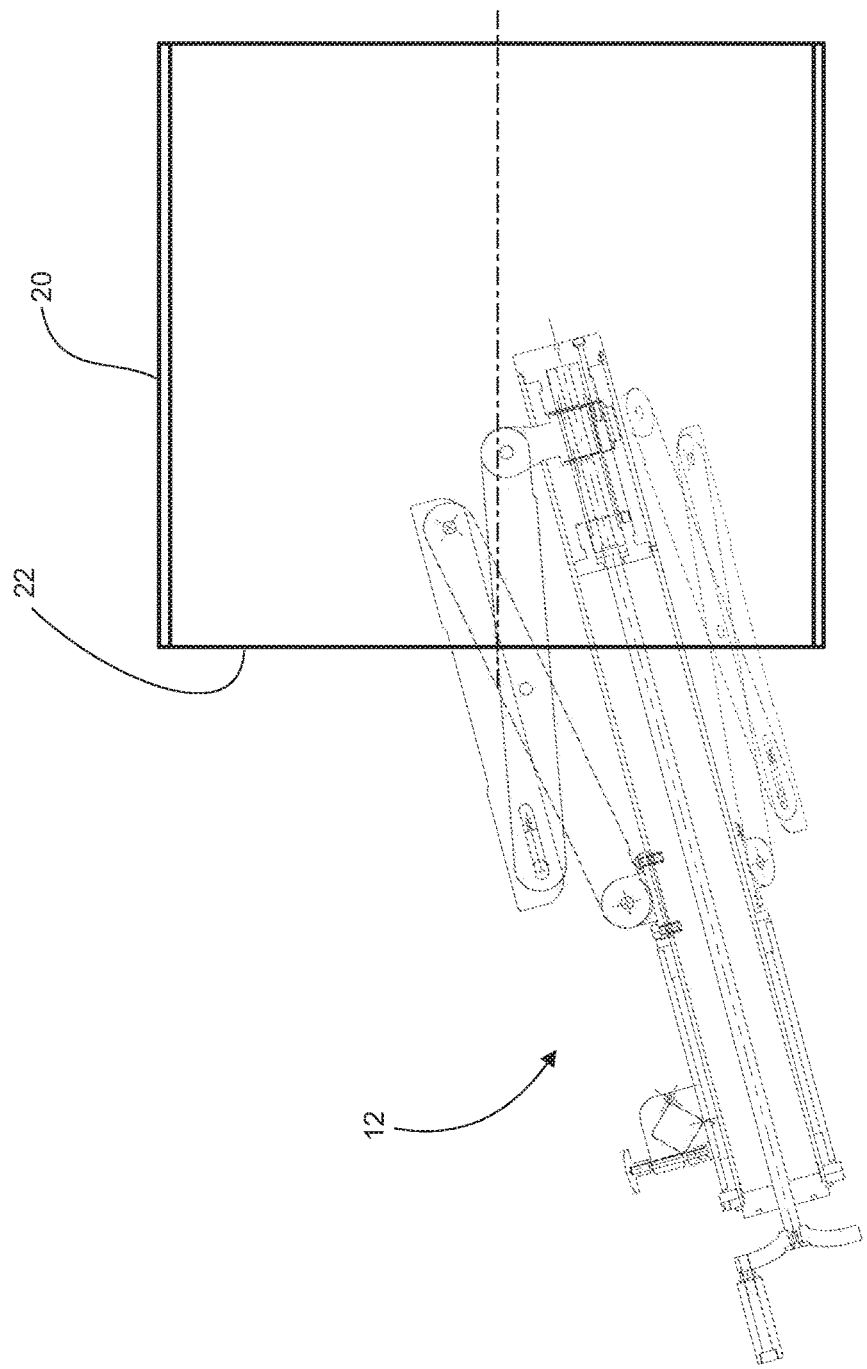

In FIG. 3B, the jig 12 is inserted through the pipe end 22 into the pipe 20, the feet 36,36 resting on lower inside walls of the pipe 20. At FIG. 3C, the standoffs 30,30,30 jig 12 is almost axially and fully within the pipe 20

Figure 3D:
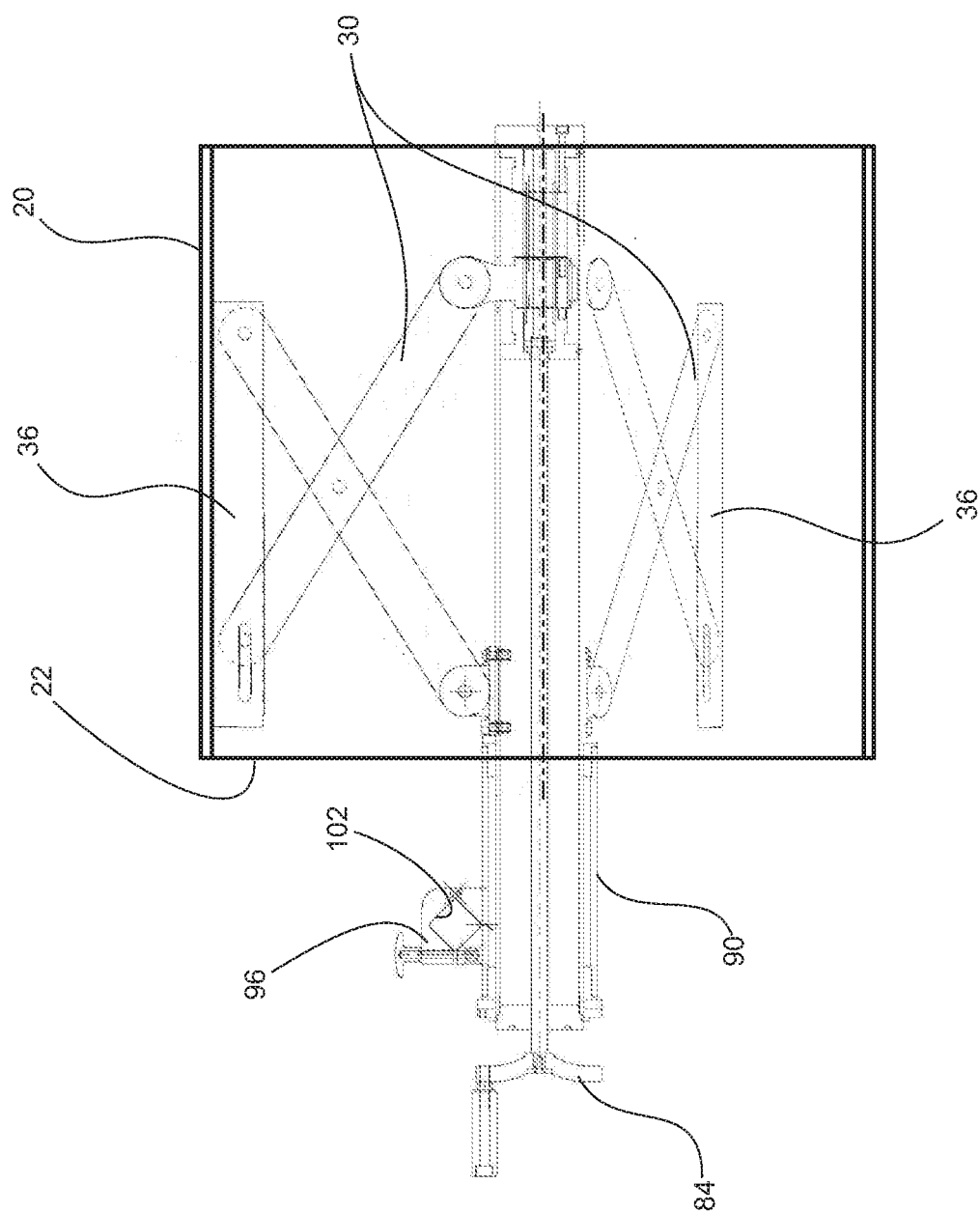

At FIG. 3D, the foot 36 of each standoff 30 is axially fully within the pipe 20 and the standoffs 30 are actuated to engage the inside diameter of the pipe 20, rendering the jig 22 concentric with the pipe end 22. In this embodiment, the handwheel 84 is rotated to shift the carriage 74, and each connected first inner end 50, towards its respective second inner end 52. The foot 36 of each standoff 30 moves to the extended position, with the effective diameter of the jig 12 now the same as inside diameter ID of the pipe 20 and with some preload thereon. In FIG. 3D, as three standoffs are shown, with one standoff vertical, the view of the bottom standoffs are foreshortened and while the feet are engaging the pipe, they do so above the bottom of the pipe.

With continued reference to FIG. 3D, note that for the linear form of embodiment of the attachment arm 98, the attachment mount 96 remains outside of the pipe end 22, so that rotation of the sleeve 90, attachment mount 96, and attachment arm 96 are freely rotating.

Figure 3E:
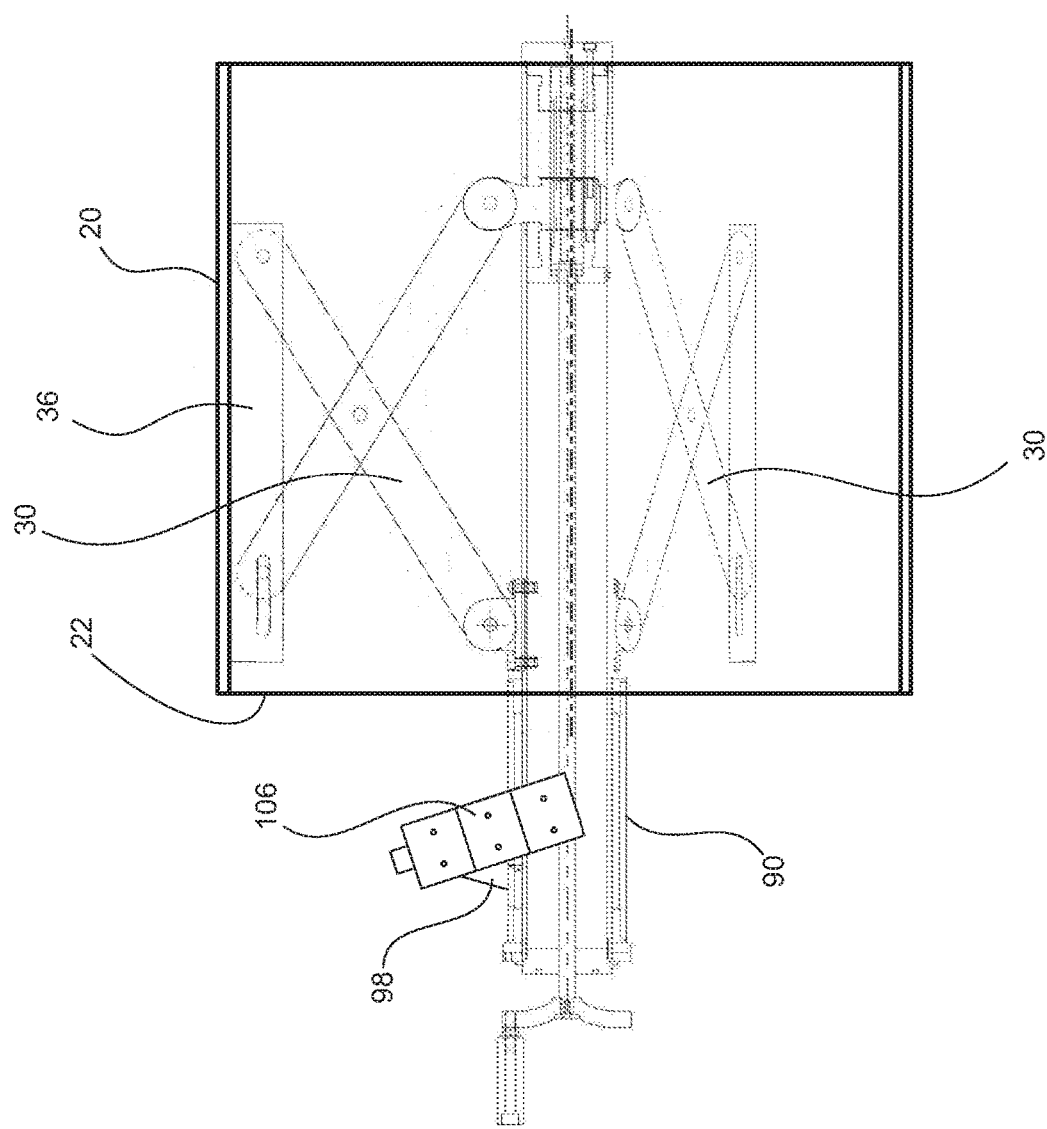

At FIG. 3E, the attachment arm 98 is inserted into the mount 96, in this view with the arm 98 extending into the page on a downward angle. The tool mount 106 is shown in the foreground ready to receive a tool 14.

Figure 3F:
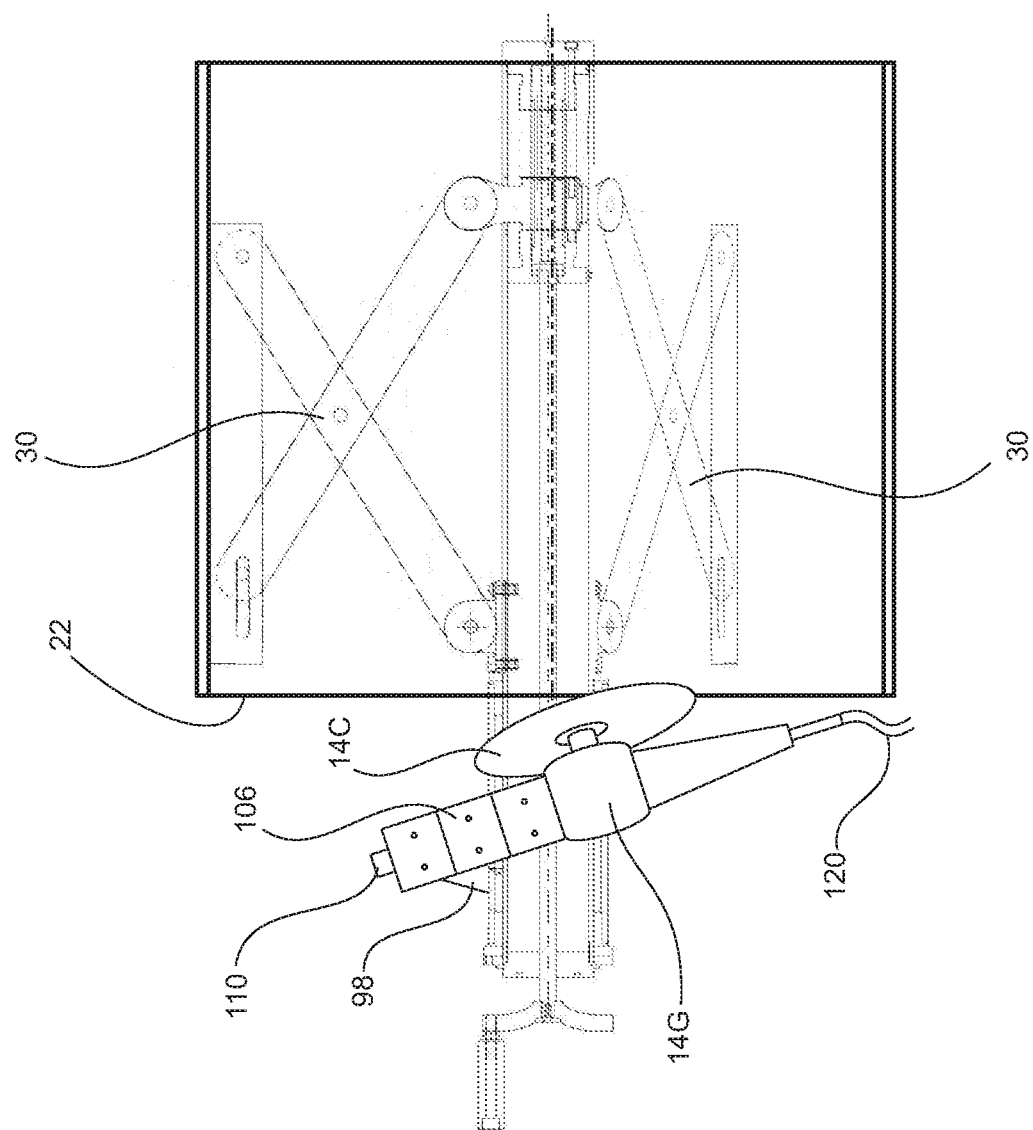

Turning to FIG. 3F, a grinder 14G form of tool 14 is securely installed to the grinder mount 106. The clamping bore 102 of the attachment mount 96 is opened or loosened and the grinder radial position is set by sliding the bar 98 therethrough. If necessary, the operator initially roughly sets the grinder disc 14C against the end of the pipe end 22 by loosening each standoff 30 as necessary and sliding the truing apparatus 10 axially into the pipe end 22. If not already tightened, the standoffs 30,30,30 are expanded to concentrically align the jig 12 and tool 14 with the pipe end, the grinder cutting head against the pipe end. The fine translation of the slide mechanism 110 can be manipulated to apply the tool 14 against the pipe end 22.

Figure 4:
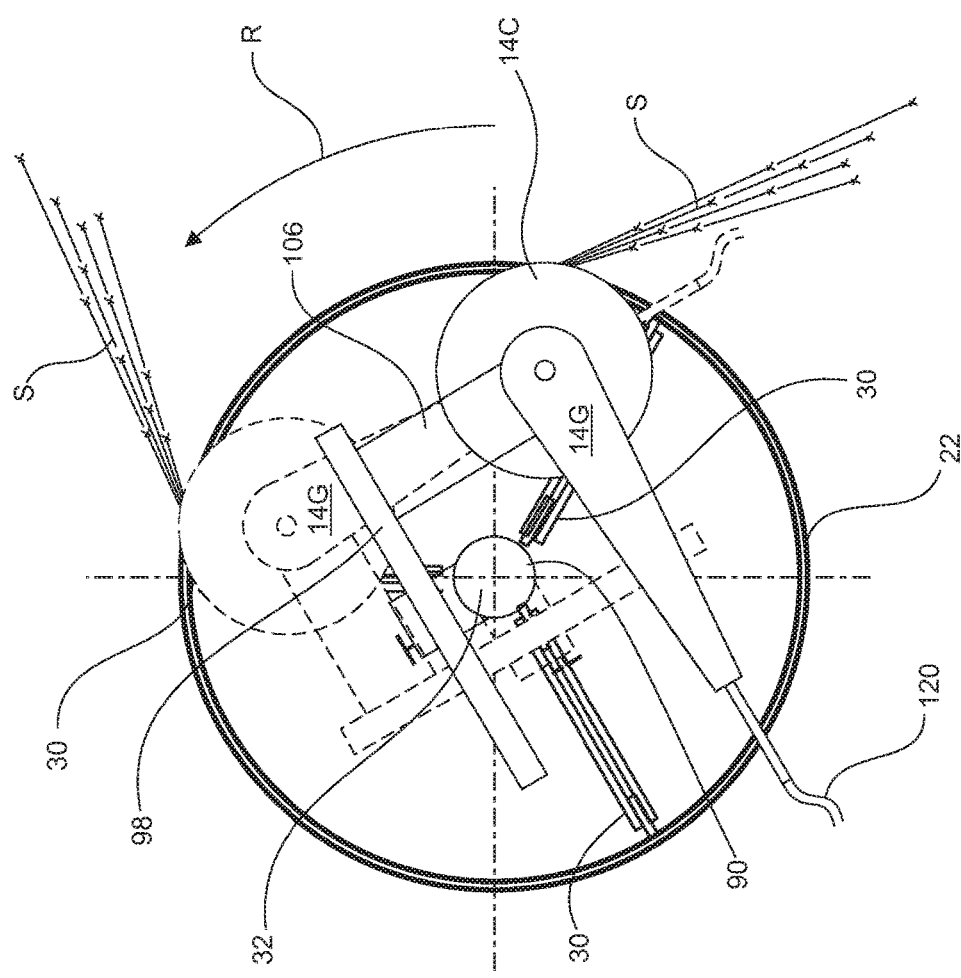
FIG. 4 is an end view of the truing jig of FIG. 3F with the tool being operated to dress, shape and true the pipe end while being rotated in the direction of the arrow, a second position shown in dotted lines, the tool in this embodiment being an angle grinder.

With reference to FIG. 4, the grinder 14G is started and the spinning disc 14C begins to remove material from the pipe end 22, the spark trail S illustrated at a tangent to the spinning disc 14C. To dress the face of the pipe end 22 about the entirely of the pipe end's circumference, the sleeve 90, attachment arm 98 and attached grinder 14G are rotated R about the central body 32 for removing material from the pipe end 22, shown rotated 90 degrees. The rotation can be manual by an operator or motor-driven.

In this embodiment, the grinder attachment bar 98 or the grinder 14G itself can be used as a handle to manually rotate the grinder and sleeve around the axis of the tool's central body 32, providing a concentric, uniform and beveled ground edge on the pipe end 22.

Once the grinder 14G has been around once or twice, or the end face is noted to remain uneven, the grinder mount 106 can be adjusted to move the grinding disc axially by slide mechanism 110, and slightly closer to the pipe end 22 to remove more material on a subsequent rotation. Similarly, contemporaneously, or sequentially, the angle of the grinder 14G against the pipe end 22 using angular mechanism 108 can be adjusted to prepare a bevel. The rotation of the grinder 14G about the pipe 20, and incrementally advancing the disc 14C against the pipe end 22 is repeated as necessary to provide a superior interface for butt joint welding or other welding arrangements.

The grinder electrical cord 120 can be tucked up out of the way, reset periodically to avoid tangling, guided through a ring supported by the central body 32 or electrically connected through a swivel.

As a result, the truing assembly 10 enables a quick setup or fit up time to each pipe end 22, more uniform pipe end faces, and better compliance with weld parameters for a butt joint including material gap and bevel angle. The improvement in welding conditions results in faster weld times per joint. Applicant has noted the assembly 10 can save up to 1.5 hours per weld on a 16" to 48" diameter pipe end 22. The truing assembly 10 is portable, and can be used by one person or operator without a need for added heavy machinery.

While adjustable to fit a range of pipe diameters, a range of jig sizes can be provided in incremental sizes for nominal and common pipe diameters of 16-24", 24"-36" and 36"-48".

Figure 5:
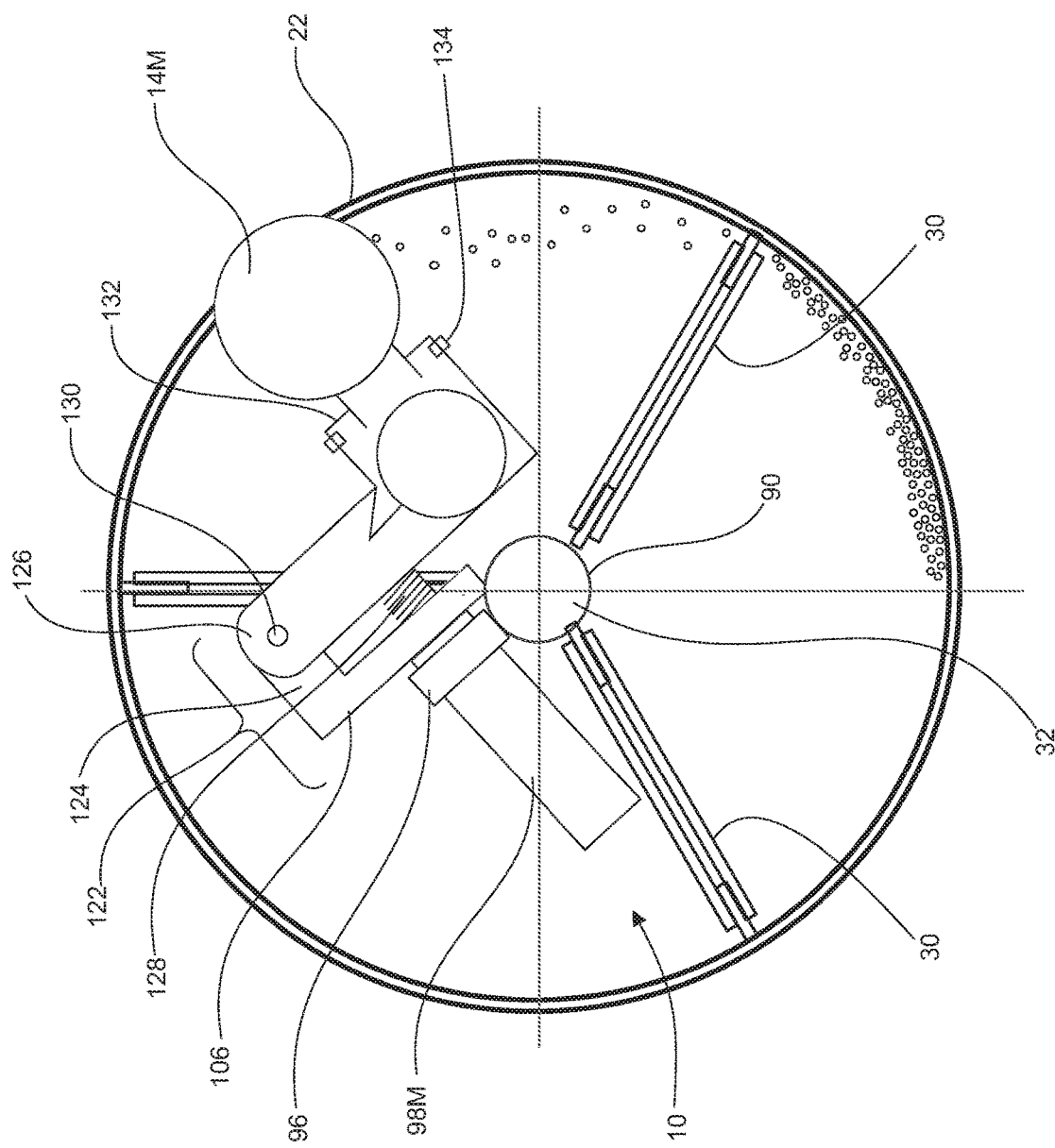
FIG. 5 is an end view of a truing jig being operated to true the pipe end, the tool in this embodiment being an milling tool.
Figure 7A:
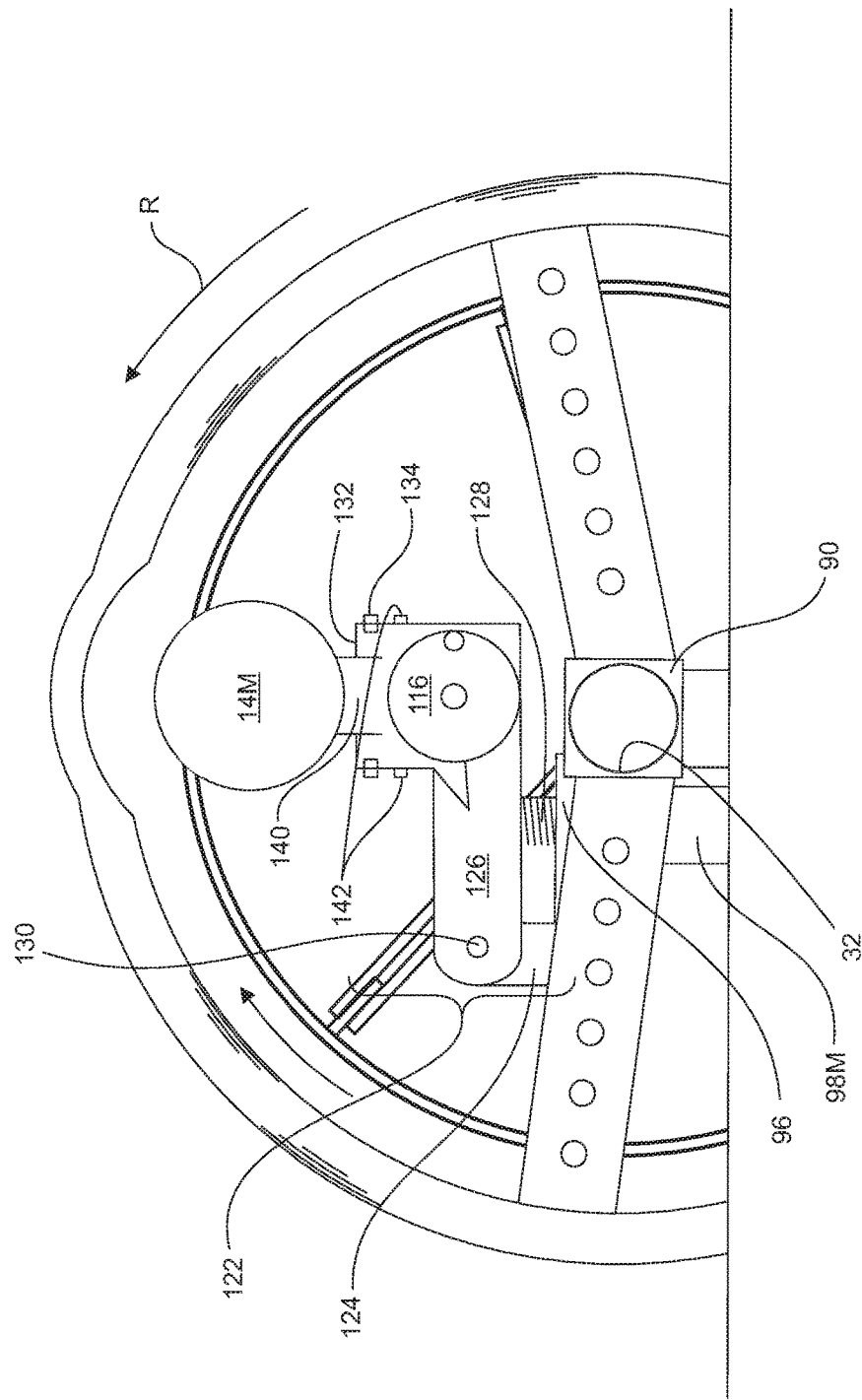
FIGS. 7A and 7B are various close-up views of an attachment arm between the truing jig and a milling tool, and more particularly.
Figure 7B:
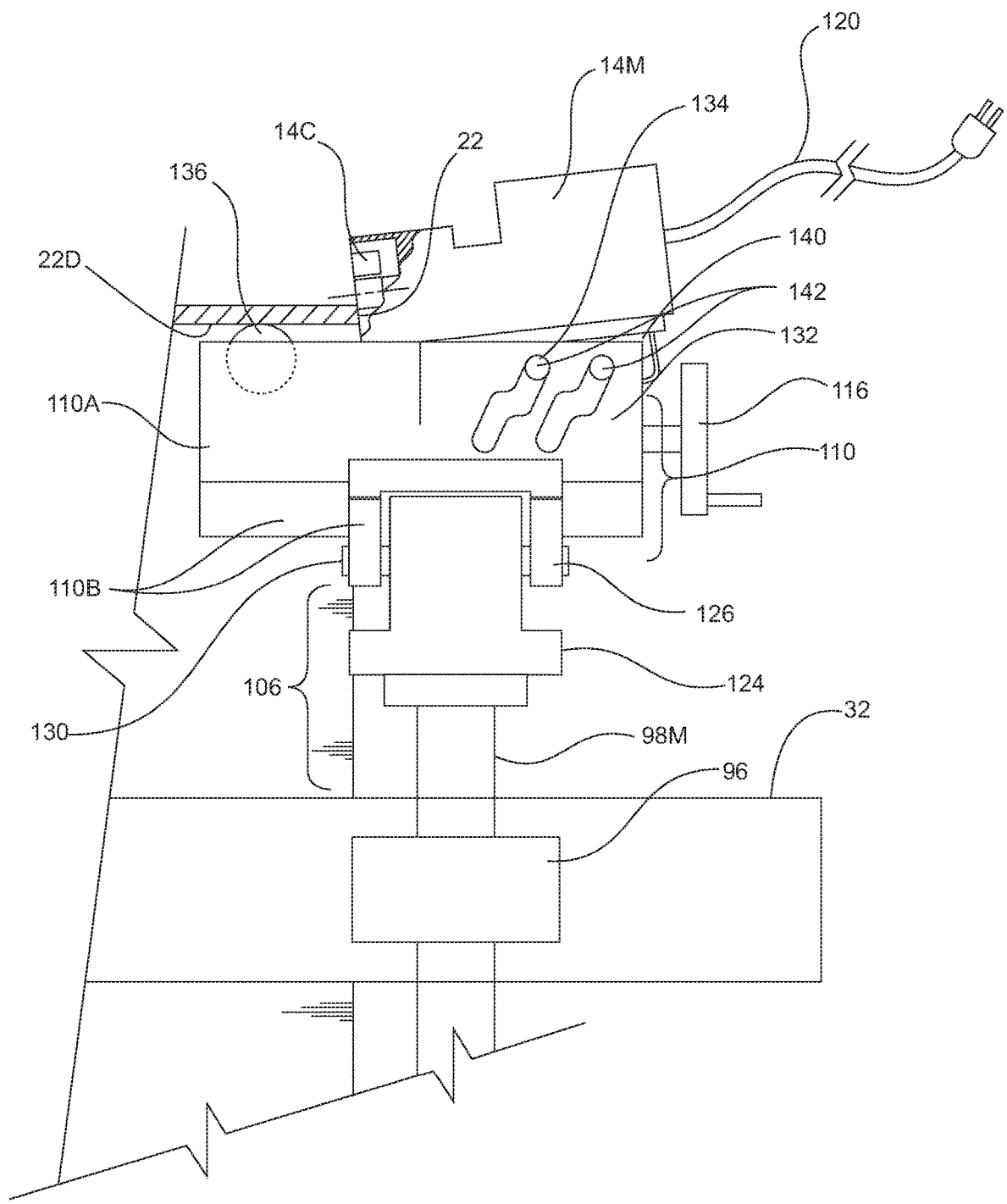

With reference to FIGS. 5, 7A, and 7B, a scouring or milling tool 14M is fit to the truing assembly 10, in place of a grinding tool 14G embodiment of FIG. 4. Note, herein the terms grinding, milling, cutting and material removal from the pipe end are used synonymously throughout. The greater weight of the tool and precision of milling cutters 14C for a milling-type tool 14M benefit from a more robust attachment arm 98M, and modifying the installation procedure by installing the jig 12 first in the pipe end before adding the attachment arm 98, the tool 14 or both. As shown, an attachment arm 98 suitable as a milling attachment arm 98M could be more structurally substantial and include more degrees of freedom for orienting the milling tool cutter face, and for finer angular and axial advancement control.

The arm 98M is still attached to the jig's central body 32 at the sleeve 90 through the arm mount 96. The tool mount 106 is more substantial in this embodiment and includes connection to an articulated joint 122 and various axial 110 and angular advancement means 110, 108.

The tool mount 106 is secured to the articulated joint 122 at a base portion 124, and a pivoting portion 126 is biased radially outwardly with a spring 128 relative to the base portion 124.

The pivoting portion 126 articulates about a pivot pin 130 parallel to the axis of the central body 32 for radial movement of the tool 14. The milling tool 14M is mounted to a radially distal, mount end 132 of the pivoting portion 126 with the tool cutter 14C portion facing the pipe end 22. The tool distal mount end 132 includes an angular adjustment 108 that has a pivot pin 134 transverse to the axis A of the central body 32.

As stated above, the pivoting portion 126 is biased radially outward. Best seen in FIG. 7B, and to radially align a cutter 14C of the milling tool 14M with the pipe end 22 regardless of ovality or run out, a tracking wheel 136, such as a guide wheel or roller ball can be used to engage and track the inside wall 22D of the pipe end 22, improving the truing accuracy of the pipe end 22, relative to the pipe wall 22, and less so on the nominal axis A. The bias of the spring-loaded articulated joint 122 ensures the radial alignment of the tool cutter 14C and pipe end 22.

With reference to FIG. 7B, the distal mount end 132 includes the axial slide 110 and handwheel 116, the tool 14M, mounted to a first slide body, such as a first dovetail block 110A, axially and slidably mounted to a second slide base 110B. The first slide body 110A is axially adjustable relative to the second slide base 110B such as through the handwheel 116 and a threaded actuator. The slide body 110A can also be fit with angular adjustment 108 through a tool mount body 140, pivotally connected through pin 134 to the tool distal mount end 132. The angular position can be fixed using an arcuate slot through the mount end 132 and lock bolt 142 extending therethrough to the tool mount body 140. Cuttings from the cutter 14C, fall to the ID of pipe 20 below.

Figure 10:
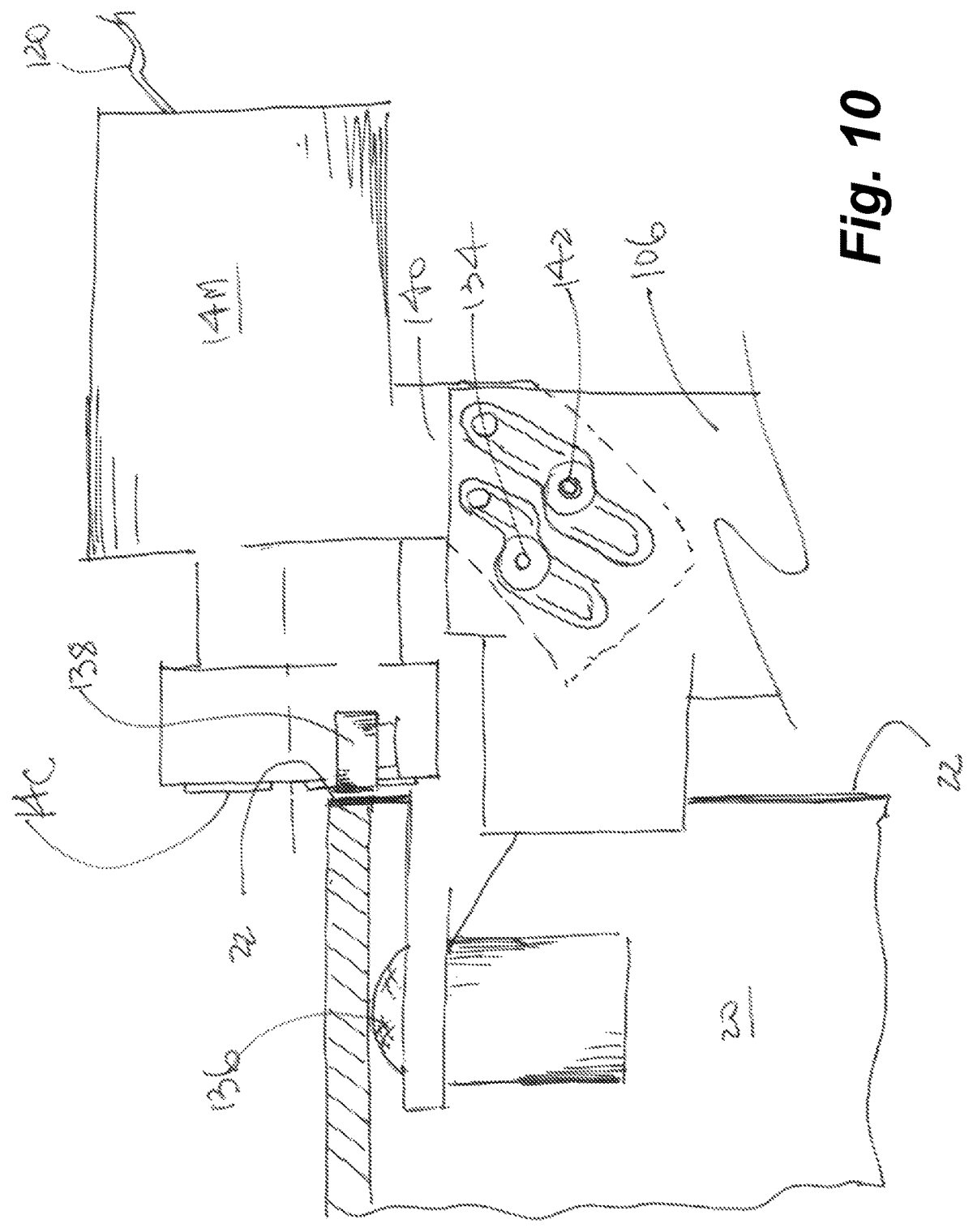
Figure 11:
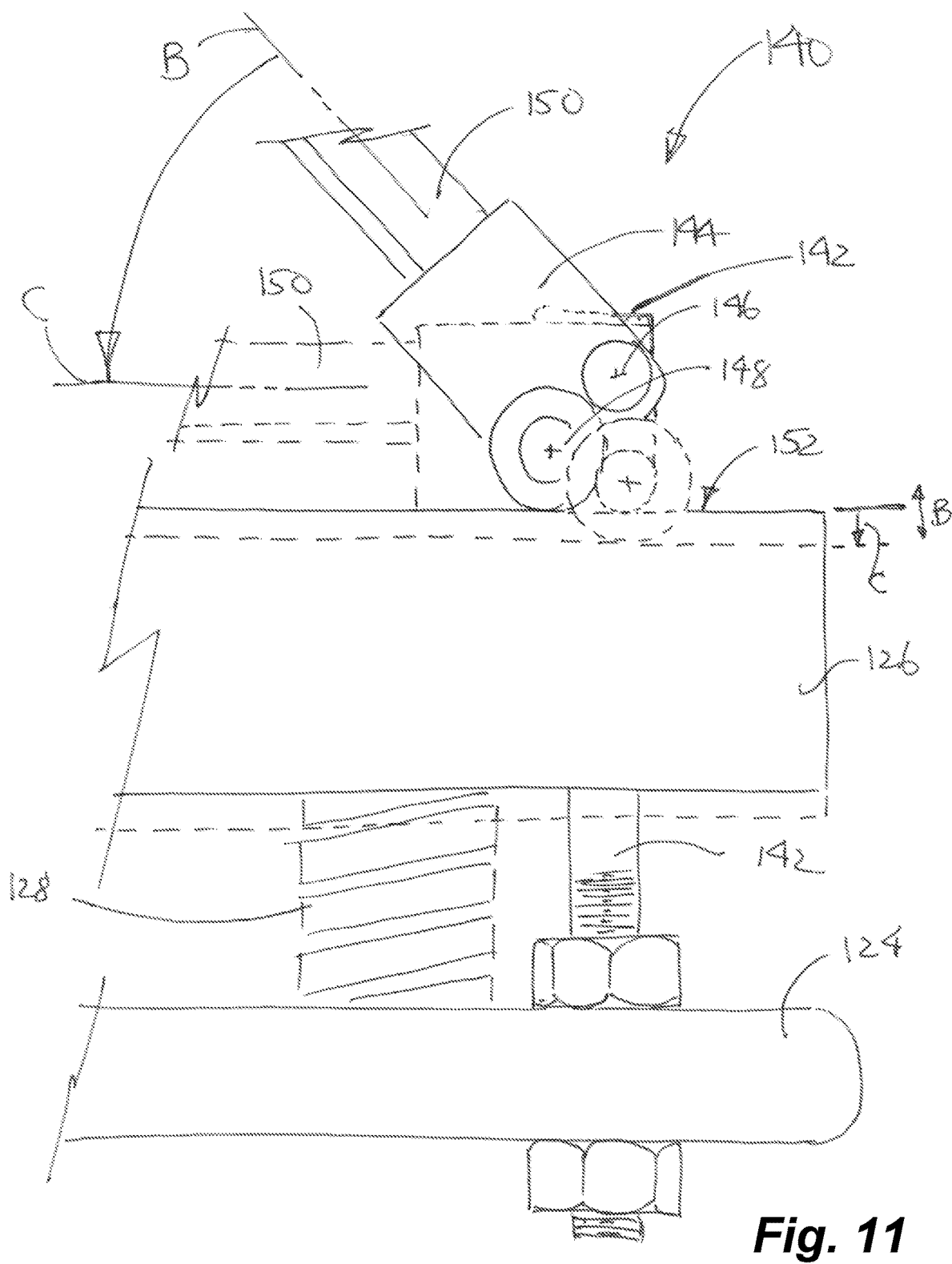
FIG. 11 is a side view of the articulated portion of an attachment arm according to FIG. 7A, the pivoting portion fit with a spring compression tool shown in a working position and a compression position (dotted lines) for releasing the tool-tracking preload to the inside of the pipe end.

With reference to FIGS. 10 and 11, another adjustment associated with the tool mount 106 can include pipe end tracking so that, while the jig 12 provides general concentricity with the pipe, the tool 14 can more directly track the pipe end 22 despite some out-of-round conditions. As shown, the tool cutter 14C is located against the pipe end 22. An idler 138 or straddling idlers 138, supported by the tool, for axially engaging the pipe end 22 provide axial material removal, or kerf, depth control. The cutter 14C radial alignment can be more finely controlled using the tracking wheel 136 that radially aligns the cutter 14C and the pipe end 22. The tool 14 is biased radially outwardly. As the pipe end 22 varies from an ideal circular section, the tracking wheel 136 tracks the pipe radius ID/2, and the tool's bias follows the pipe end 22 radially outward, and the bias is compressed radially inward to follow the pipe end 22 radially inward.

As shown in FIGS. 7A and 11, the articulating portion 122 of the tool mount 106 is biased radially outwardly by spring 128. The pivoting portion 126 is actuated between a freely-biasing position B to a compressed position C by a compression lever assembly 140. In the biasing position B, the pivoting portion 126 is free to move radially in and out, biased by spring 128, to track the pipe end 22, as shown in FIGS. 10 and 7B. For installation and maintenance, such as for tool 14 and tool mount 106 installation to the jig 12, the spring 128 can be temporarily compressed to the compressed position C, limiting the range of motion of the pivoting portion 126. The pivoting portion 126 can be forced against the bias of the spring 128 by the compression lever assembly 140. The compression lever assembly 140 comprises a tie bar 142, secured to the base portion 124, passing through a port in the pivoting portion 126 and pivotally connected to a head 144 of the lever 140 at fulcrum pin 146. The head 144 is further fit with a pry wheel 148 offset from the fulcrum pin 146. The lever assembly 140 has a handle 150 for applying the moment necessary to rotate the pry wheel 148 against a pry surface 152 of the pivoting portion 126. In the compressed position C, the pry wheel 148 is situate between the pivoting portion 126 and the fulcrum pin 146, for driving the pivoting portion 126 towards the base portion 124, compressing spring 128 and spacing the tracking roller 136 and tool 14 radially inward from the pipe end 22. In the compressed position C, the axis of the pry wheel 148 can be forward of the fulcrum pin 146 and tie bar 142 to result in an over-centered, self-locking position.

Figure 6:
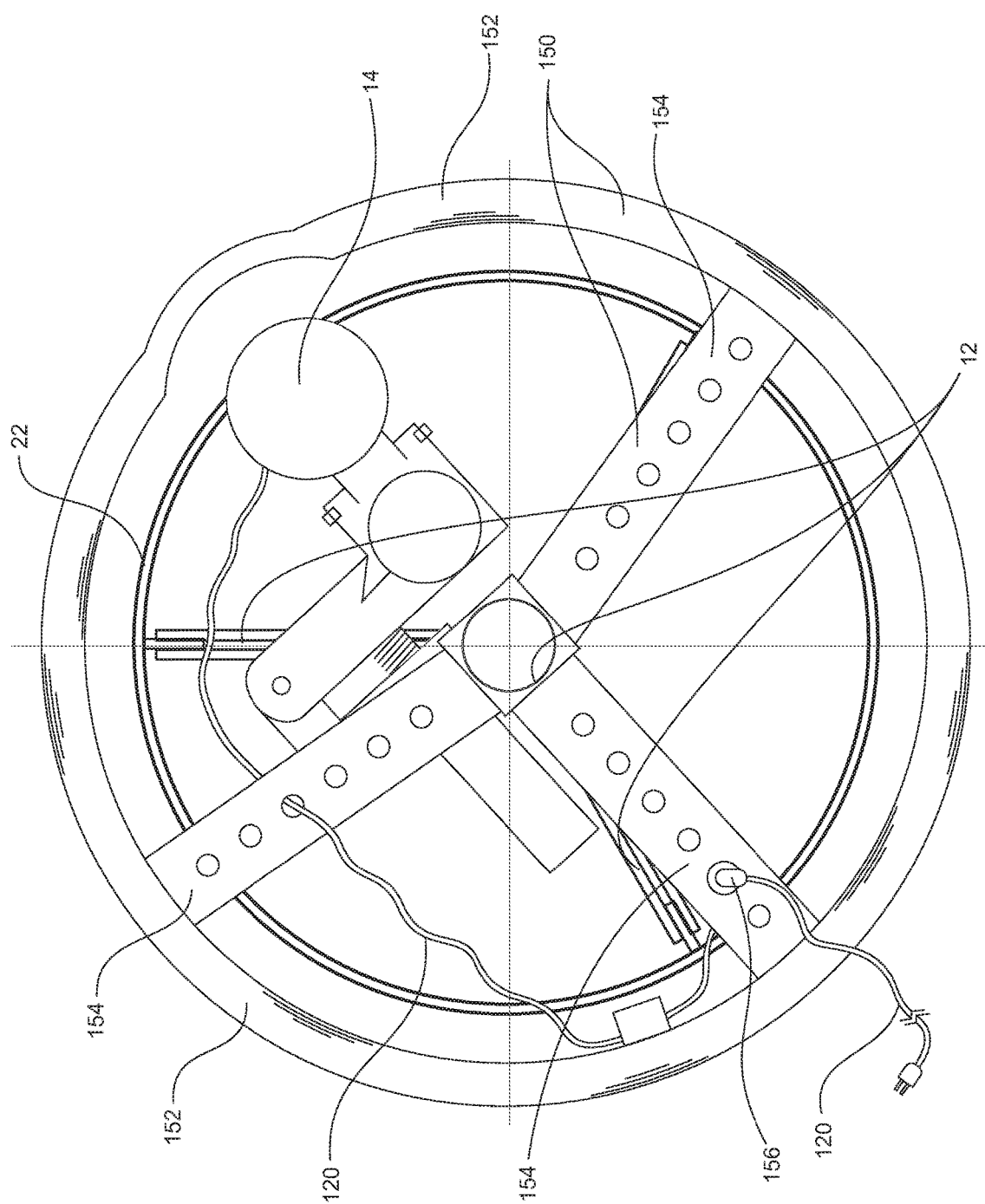
FIG. 6 is an end view of a truing jig with a hand wheel for ease of rotation of the tool, in this case an electrically powered milling tool, and an electrical cord swivel for permitting unlimited rotation of the milling tool without tangling of the electrical power supply cord.

Returning to FIG. 6, additional mechanical advantage for rotating the tool 14 about the jig 12 can be provided through a steering wheel 150, added to aid the operator in a smooth rotary action of the tool 14 about the pipe end 22. The steering wheel 150 comprises a generally circular grip 152, extending circumferentially about the jig 12. In this embodiment, the steering wheel 150 is larger in diameter than the pipe which may aid in applying torque to the rotation of the tool 14, and access through the wheel 150 to the jig 12, attachment mount 96, arm 98 and tool mount 106. The circular grip 152 can be interrupted or distended as necessary to accommodate localized projections such as the tool 14 itself. The grip 152 is suspended and secured to the sleeve 90 with two or more spokes 154, for co-rotation of the circular grip 152, attachment arm and tool 14. The electrical cord 120 can be supported for convenience through lightening holes in the spokes and terminated at an electrical swivel 156 for endless rotation without damage.

In another embodiment, the apparatus can be fit with an automated drive for rotating the tool 14 about the pipe end 22. As applied to the embodiment of FIGS. 7A through 11, replacing the roller ball form of tracking wheel 136 of FIG. 11, a drive wheel 160 can be provided to drivably engage the ID of the pipe 20 and pull the milling tool 14M around the pipe end 22.

As shown, the tool mount 106 is further provided with a motor 162 and drive assembly (not detailed) for driving wheel 160. The motor 162 can include a gearbox reduction unit for driving the wheel 160 in a high torque, slow rotational speed operation. The wheel 160 can be a solid resilient wheel, such as a polyurethane wheel, or a wheel and tire fit with a resilient gripping surface, such as a polyurethane or vulcanized rubber surface for a mark free, high friction interface.

The motor 162 and gearbox unit can be custom specified for the torque and speeds required, or selected from those conventionally used for automated welding. It is known in the welding field to utilize drives having 4" (100 mm)-6" (150 mm) diameter with lineal speeds of 4" to 60"/min (10-150 cm/min).

Figure 12A:
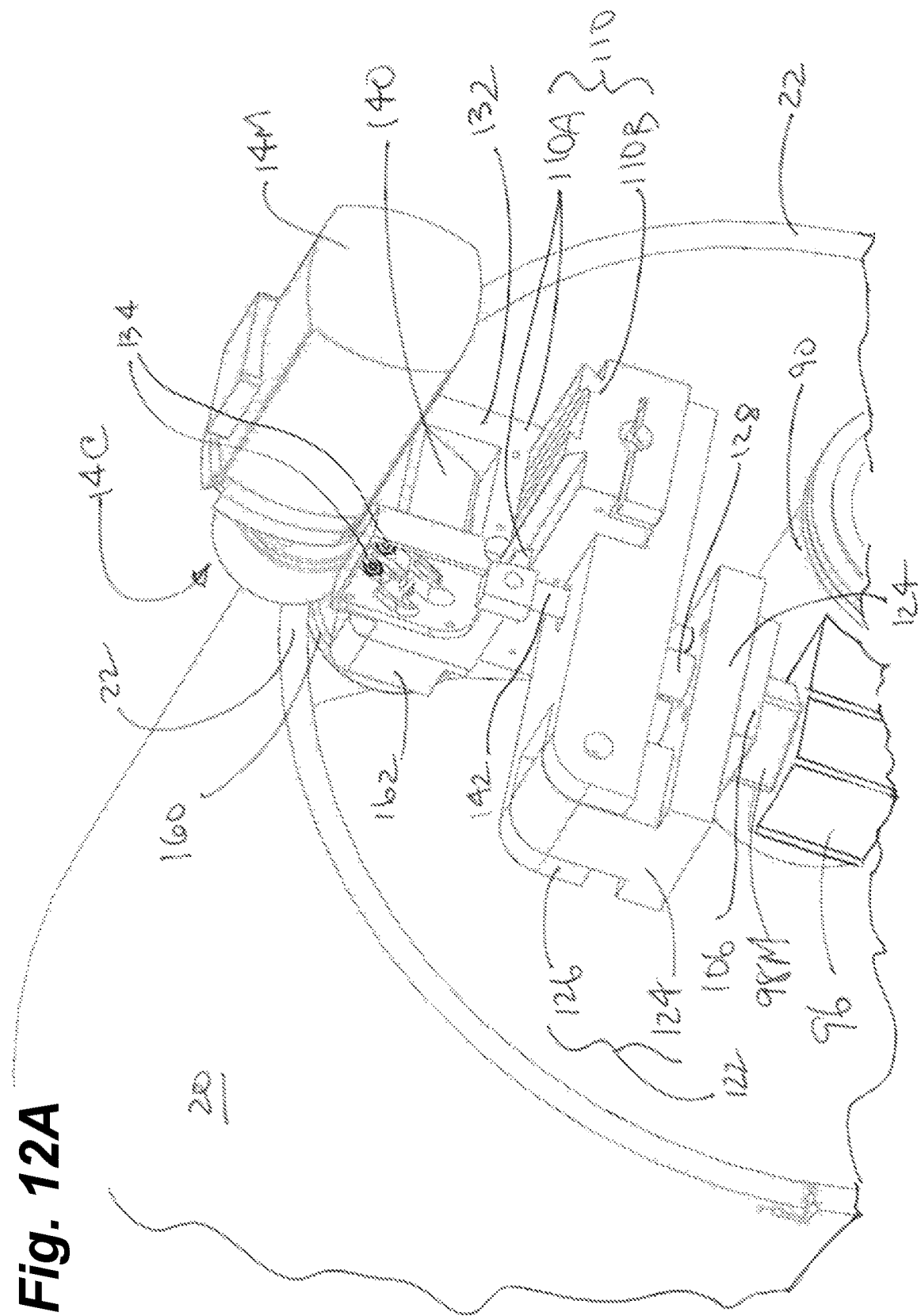
FIGS. 12A and 12B are left and right side perspective views of a milling embodiment of the truing apparatus having an automated drive for auto-rotation of the tool about the pipe end.
Figure 12B:
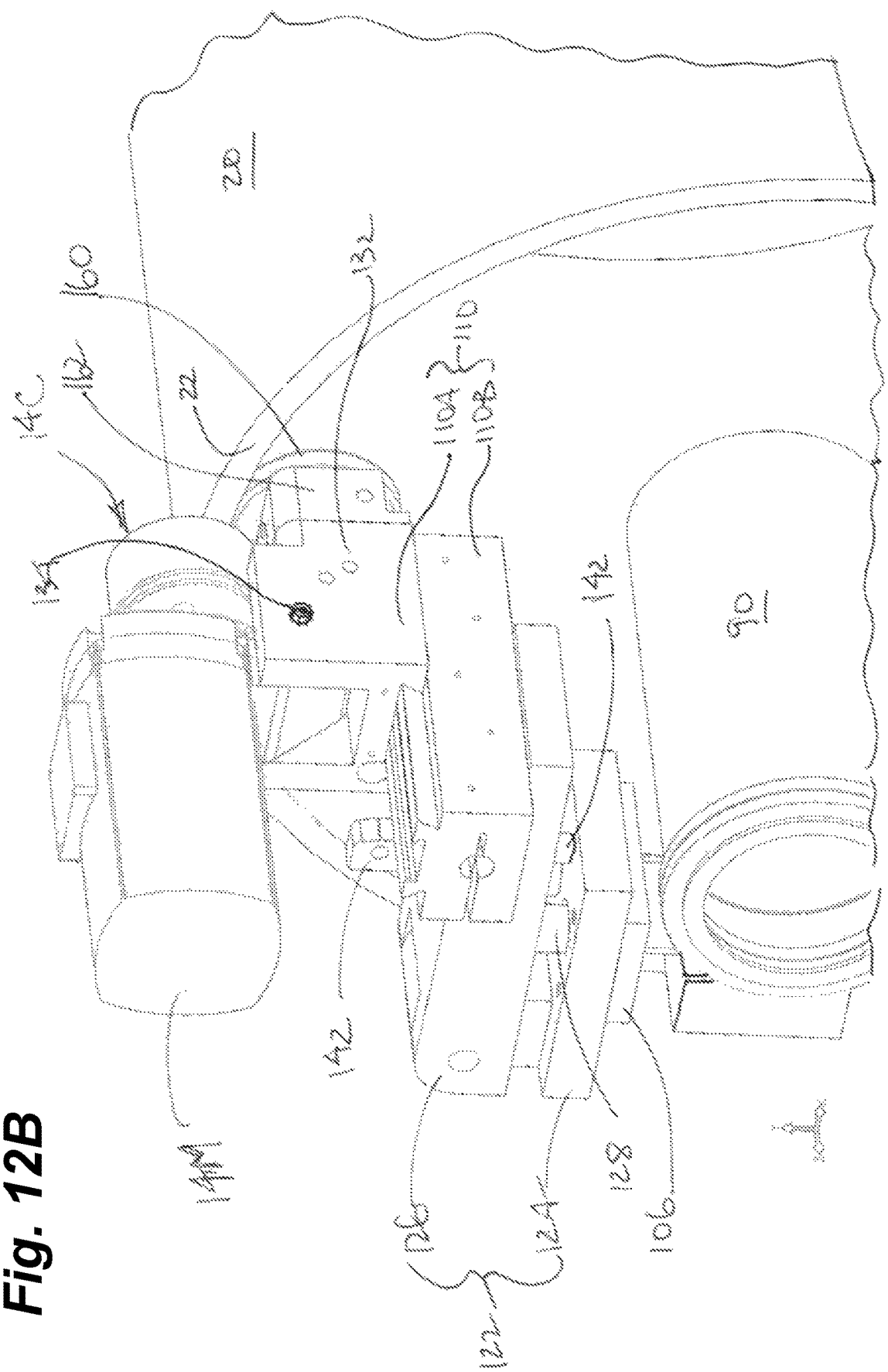

Further as shown in more detail, the articulating portion 122 is secured to the tool mount 106. The arm 98M is still attached to the jig's central body 32 at the sleeve 90 through arm mount 96. The articulated joint 122 is fit with various axial, angular, or radial advancement means. The milling tool 14M is mounted to the radially distal mount end 132. The motor 162 and gearbox can be secured to the distal mount end 132 with an axle of the wheel 160 projecting parallel to the axis of the pipe 20. The angular adjustment of the tool distal mount end 132 includes one or more lock bolts 142 transverse to the axis of the central body 32. The lock bolts 142 secure the mount end 132 to the tool mount body 140 at the selected angular position. Further, in this embodiment, the distal mount end 132 serves as the first dovetail block 110A and the pivoting portion 126 of the articulated portion 122 serves as the second slide base 110B. The first dovetail block 110A is axially and slidably mounted to the second slide base 110B. The first slide body 110A is axially adjustable relative to the second slide base 110B such as through a handwheel and a threaded actuator (not shown in FIG. 12A).

The invention claimed is:

1. Apparatus for truing a pipe end of a generally circular pipe having an inside diameter and a pipe axis, comprising:
   a jig comprising:
      a body having a first end and a second end for placement within the pipe;
      a sleeve for rotation about the first end of the body;
      two or more standoffs extending radially from the body and operable between a retracted position and an expanded position, wherein in the expanded position the standoffs releasably engage the inside diameter of the pipe for locating the body generally concentric within the pipe along the pipe axis with the sleeve accessible from the pipe end; and
   a tool supported from the sleeve for engaging the pipe end and rotatable thereabout with the sleeve;
   wherein each standoff is a pantograph linkage comprising a pair of lever arms pivotally connected at an intermediate location, an inner end of each lever arm adjacent the body, one inner end fixed axially thereto and one inner end being axially actuable for scissoring the inner ends of the lever arms together and apart relative to the other whilst outer ends of each lever arm also move together and apart between the extended and retracted positions respectively.

2. The apparatus of claim 1 further comprising a mounting arm extending generally radially from the sleeve for supporting and spacing the tool radially from the sleeve.

3. The apparatus of claim 2, wherein the mounting arm comprises a first end for mounting at the sleeve and a second end having a tool mount for connection to the tool, the tool mount having an axial adjustment mechanism, an angular adjustment mechanism, or both for adjusting the tool's engagement with the pipe end.

4. The apparatus of claim 3, wherein the first end of the mounting arm comprises an elongate bar and the sleeve further comprises an attachment mount having a clamping bore, the bar and clamping bore each having a non-circular profile.

5. The apparatus of claim 1, wherein the standoffs are distributed circumferentially about the body.

6. The apparatus of claim 1, wherein the jig further comprises a linear actuator for actuating the standoffs between the retracted and extended positions.

7. The apparatus of claim 6, wherein the linear actuator further comprises:
 a screw extending along the jig's body; and
 a carriage movable back and forth along the screw, the carriage pivotally connected to each actuable inner end of a corresponding standoff.

8. The apparatus of claim 7, wherein the carriage has radially extending lobes, each lobe extending through an axial slot in the body pivotal connection to the actuable inner end of a corresponding standoff.

9. The apparatus of claim 1, wherein the tool is a grinder.

10. The apparatus of claim 2, wherein the mounting arm comprises a first end for mounting at the sleeve and a second end having a tool mount for connection to a milling tool having a cutting tool face for engaging the pipe end, the tool mount further comprising a tracking wheel to track the inside diameter of the pipe for aligning the tool face with the pipe end.

11. The apparatus of claim 10, wherein the tool mount is articulated, having a base portion and a pivoting portion, the pivoting portion biased radially outwardly for urging the tracking wheel against the inside diameter of the pipe.

12. The apparatus of claim 11, wherein the tracking wheel is driven for driving the tool about the pipe end.

13. The apparatus of claim 11, further comprising a compressor for forcing the pivoting portion against the biasing for temporarily releasing the tracking wheel from the pipe.

14. Apparatus for truing a pipe end of a generally circular pipe having an inside diameter and a pipe axis, comprising:
 a jig comprising:
  a body having a first end and a second end for placement within the pipe;
  a sleeve for rotation about the first end of the body;
  two or more standoffs extending radially from the body and operable between a retracted position and an expanded position, wherein in the expanded position the standoffs releasably engage the inside diameter of the pipe for locating the body generally concentric within the pipe along the pipe axis with the sleeve accessible from the pipe end; and
 a tool supported from the sleeve for engaging the pipe end and rotatable thereabout with the sleeve;
 wherein the jig further comprises a linear actuator for actuating the standoffs between the retracted and extended positions, the linear actuator comprising:
  a screw extending along the jig's body; and
  a carriage movable back and forth along the screw, the carriage pivotally connected to each actuable inner end of a corresponding standoff and having radially extending lobes, each lobe extending through an axial slot in the body pivotal connection to the actuable inner end of a corresponding standoff.

15. The apparatus of claim 14 further comprising a mounting arm extending generally radially from the sleeve for supporting and spacing the tool radially from the sleeve.

16. The apparatus of claim 15, wherein the mounting arm comprises a first end for mounting at the sleeve and a second end having a tool mount for connection to the tool, the tool mount having an axial adjustment mechanism, an angular adjustment mechanism, or both for adjusting the tool's engagement with the pipe end.

17. The apparatus of claim 16, wherein the first end of the mounting arm comprises an elongate bar and the sleeve further comprises an attachment mount having a clamping bore, the bar and clamping bore each having a non-circular profile.

18. The apparatus of claim 14, wherein the standoffs are distributed circumferentially about the body.

\* \* \* \* \*